United States Patent
Nakamori et al.

(10) Patent No.: US 12,554,185 B2
(45) Date of Patent: Feb. 17, 2026

(54) COOLED LIGHT SOURCE APPARATUS AND PROJECTION TYPE IMAGE DISPLAY APPARATUS WITH NOISE-REDUCING FAN SYSTEM

(71) Applicant: Maxell, Ltd., Kyoto (JP)

(72) Inventors: Hiroshi Nakamori, Kyoto (JP); Hiroshi Shiina, Kyoto (JP); Kazuo Shikita, Kyoto (JP); Yusuke Matsumoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 718 days.

(21) Appl. No.: 17/797,429

(22) PCT Filed: Jan. 27, 2021

(86) PCT No.: PCT/JP2021/002894
§ 371 (c)(1),
(2) Date: Aug. 4, 2022

(87) PCT Pub. No.: WO2021/157452
PCT Pub. Date: Aug. 12, 2021

(65) Prior Publication Data
US 2023/0072330 A1 Mar. 9, 2023

(30) Foreign Application Priority Data
Feb. 5, 2020 (JP) .................. 2020-017812

(51) Int. Cl.
*G03B 21/16* (2006.01)
*G03B 21/20* (2006.01)
(Continued)

(52) U.S. Cl.
CPC ........... *G03B 21/16* (2013.01); *G03B 21/204* (2013.01); *H04N 9/3144* (2013.01); *H05K 7/20972* (2013.01); *H05K 7/2099* (2013.01)

(58) Field of Classification Search
CPC ..... G03B 21/204; G03B 21/16; H04N 9/3144
See application file for complete search history.

(56) References Cited

U.S. PATENT DOCUMENTS 9,667,925 B2 * 5/2017 Nagatsu ............... H04N 9/3144
2005/0270775 A1 12/2005 Harbers et al.
(Continued)

FOREIGN PATENT DOCUMENTS

JP 2005-347263 A 12/2005
JP 2011-75898 A 4/2011
(Continued)

OTHER PUBLICATIONS

Office Action issued on Jun. 27, 2023, in corresponding Japanese patent Application No. 2021-575750, 8 pages.
(Continued)

*Primary Examiner* — Bao-Luan Q Le
(74) *Attorney, Agent, or Firm* — XSENSUS LLP

(57) ABSTRACT

A projection type image display apparatus including a light source apparatus includes a light emitting element emitting blue light; a phosphor receiving the blue light to emit predetermined light; a heat sink provided with a bottom portion and a plurality of heat radiation fins extending from the bottom portion; and a cooling fan arranged to cool the plurality of heat radiation fins of the heat sink. The light emitting element is attached to the bottom portion of the heat sink. The phosphor is attached to the bottom portion of the heat sink at a predetermined interval from the light emitting element. Heat pipes conducting heat by repeating evaporation and liquefaction of working liquid are embedded in the bottom portion. The heat pipes are respectively provided with sections opposing the light emitting element in a thickness direction of the bottom portion.

13 Claims, 15 Drawing Sheets

22: LIGHT EMITTING ELEMENT
28: PHOSPHOR
210a~210d: SIDE
211b: SURFACE
HS: HEAT SINK
HP1, HP2: HEAT PIPE
SE1, SE2: SECTION

(51) Int. Cl.
 *H04N 9/31* (2006.01)
 *H05K 7/20* (2006.01)

(56) References Cited

U.S. PATENT DOCUMENTS

| | | | | |
|---|---|---|---|---|
| 2007/0070303 A1* | 3/2007 | Yonekubo | ............ | G03B 21/145 |
| | | | | 353/57 |
| 2012/0242963 A1* | 9/2012 | Ohta | ............ | G03B 21/16 |
| | | | | 165/185 |
| 2014/0307232 A1* | 10/2014 | Sato | ............ | G03B 21/204 |
| | | | | 353/121 |
| 2015/0042963 A1* | 2/2015 | Nishimori | ............ | H04N 9/3111 |
| | | | | 353/57 |
| 2015/0156466 A1* | 6/2015 | Nagatsu | ............ | H04N 9/3144 |
| | | | | 353/54 |
| 2015/0234265 A1* | 8/2015 | Takamatsu | ............ | G03B 21/142 |
| | | | | 353/31 |
| 2017/0277027 A1* | 9/2017 | Fukuda | ............ | F28D 15/0275 |
| 2017/0302895 A1 | 10/2017 | Okuno et al. | | |
| 2018/0073716 A1* | 3/2018 | Takada | ............ | H10H 20/855 |

FOREIGN PATENT DOCUMENTS

| | | |
|---|---|---|
| JP | 2012-13897 A | 1/2012 |
| JP | 2014-206581 A | 10/2014 |
| JP | 2015-36708 A | 2/2015 |
| JP | 2016-189440 A | 11/2016 |
| JP | 2017-172876 A | 9/2017 |
| JP | 2017-194675 A | 10/2017 |
| JP | 2018-124443 A | 8/2018 |

OTHER PUBLICATIONS

International Search Report and Written Opinion mailed on Apr. 13, 2021, received for PCT Application PCT/JP2021/002894, filed on Jan. 21, 2021, 11 pages including English Translation.

\* cited by examiner

22: LIGHT EMITTING ELEMENT  HS: HEAT SINK
28: PHOSPHOR  HP1, HP2: HEAT PIPE
210a~210d: SIDE  SE1, SE2: SECTION
211b: SURFACE

FIG. 5

| ACTUAL RESULTS | | | HEAT SINK WITHOUT HEAT PIPE | HEAT SINK WITH HEAT PIPE | IMPROVEMENT AMOUNT |
|---|---|---|---|---|---|
| | | HEAT PIPE | ABSENCE | PRESENCE | |
| HEAT SINK | | MATERIAL | ALUMINUM ALLOY | ALUMINUM ALLOY | |
| | BOTTOM PORTION | THICKNESS [mm] | 5 | 4.7 | |
| | FIN | HEIGHT [mm] | 31 | 31 | |
| | | THICKNESS [mm] | 1 | 0.9 | |
| | | PITCH [mm] | 2.4 | 2.8 | |
| | | NUMBER | 26 | 24 | |
| AMOUNT OF HEAT GENERATION [W] | | Laser | 100 | 100 | |
| | | PHOSPHOR | 25 | 25 | |
| TEMPERATURE EVALUATION | Fan x2 | ROTATION SPEED [rpm] | 2750 | 2750 | |
| | TEMPERATURE [°C] | OUTSIDE AIR | 27.9 | 27.9 | |
| | | LIGHT EMITTING ELEMENT | 67.4 | 62.0 | |
| | | PHOSPHOR | 58.0 | 61.3 | |
| | ΔT [°C] | LIGHT EMITTING ELEMENT | 39.5 | 34.1 | −5.4 |
| | | PHOSPHOR | 30.1 | 33.4 | 3.3 |
| | THERMAL RESISTANCE [°C/W] | LIGHT EMITTING ELEMENT | 0.316 | 0.273 | −0.043 |
| | | PHOSPHOR | 0.241 | 0.267 | 0.026 |
| | Fan x2 | ROTATION SPEED [rpm] | 5250 | 5250 | |
| | TEMPERATURE [°C] | OUTSIDE AIR | 27.8 | 28.0 | |
| | | LIGHT EMITTING ELEMENT | 55.7 | 51.0 | |
| | | PHOSPHOR | 47.0 | 49.9 | |
| | ΔT [°C] | LIGHT EMITTING ELEMENT | 27.9 | 23.0 | −4.9 |
| | | PHOSPHOR | 19.2 | 21.9 | 2.7 |
| | THERMAL RESISTANCE [°C/W] | LIGHT EMITTING ELEMENT | 0.223 | 0.184 | −0.039 |
| | | PHOSPHOR | 0.154 | 0.175 | 0.022 |

COOLED LIGHT SOURCE APPARATUS AND PROJECTION TYPE IMAGE DISPLAY APPARATUS WITH NOISE-REDUCING FAN SYSTEM

CROSS-REFERENCE TO RELATED APPLICATIONS

The present application is based on PCT filing PCT/JP2021/002894, filed Jan. 27, 2021, which claims priority to JP 2020-017812, filed Feb. 5, 2020, the entire contents of each are incorporated herein by reference.

TECHNICAL FIELD

The present invention relates to a light source apparatus and a projection type image display apparatus, for example, to a cooling technique for the light source apparatus.

BACKGROUND ART

Patent Document 1 discloses a projector having a blue light source apparatus, a red light source apparatus, and a fluorescent wheel that receives blue light from the blue light source apparatus to emit green light and to diffuse the blue light. The projector is provided with a heat sink and cooling fan for cooling the blue light source apparatus, another heat sink and cooling fan for cooling the red light source apparatus, and yet another cooling fan for cooling the fluorescent wheel.

RELATED ART DOCUMENTS

Patent Documents

Patent Document 1: Japanese Patent Application Laid-open No. 2011-75898

SUMMARY OF THE INVENTION

Problems to be Solved by the Invention

For example, as shown in Patent Document 1 and the like, known has been a light source apparatus having: a light emitting element that emits blue light; and a phosphor that receives the blue light and emits light of a predetermined color. As one of such light source apparatuses, known has been an apparatus of generally using a phosphor that emits yellow light and mixing the blue light and the yellow light to produce white light. Here, the light emitting element usually needs to be cooled because an amount of light decreases with heat generation.

As a method of cooling the light emitting element, as shown in Patent Document 1, known has been a method of providing a heat sink and a cooling fan for the light emitting element. However, if the heat sink and the cooling fan are simply provided for the light emitting element, it may be necessary to rotate the cooling fan at a high speed in order to sufficiently cool the light emitting element having a large amount of heat generation. As a result, noise of the cooling fan may increase.

The present invention has been made in view of the above, and one of objects thereof is to reduce of the noise of the cooling fan in the light source apparatus in which cooling is performed by the cooling fan and in the projection type image display apparatus including the light source apparatus.

The above and other objects and novel features of the present invention will become apparent from the description and accompanying drawings herein.

Means for Solving the Problems

One embodiment of the present invention may be configured: so as to include, for example, a light emitting element emitting blue light, a phosphor receiving the blue light to emit predetermined light, a heat sink having a bottom portion and a plurality of heat radiation fins extending from the bottom portion, and one or more cooling fans arranged so as to cool the plurality of heat radiation fins of the heat sink; and so that the light emitting element is attached to the bottom portion of the heat sink, and the phosphor is attached to the bottom portion of the heat sink at a predetermined interval from the light emitting element, one or more heat pipes conducting heat by repeating vaporization and liquefaction of working fluid is embed in the bottom portion, and each of the one or more heat pipes is provided with a section opposing the light emitting element in a thickness direction of the bottom portion.

Effects of the Invention

If the effect obtained by a typical invention among the inventions disclosed in the present application will be briefly described, use of a light source apparatus that performs cooling by a cooling fan and a projection type image display apparatus including the light source apparatus makes it possible to reduce the noise of the cooling fan.

BRIEF DESCRIPTION OF THE DRAWINGS

FIG. 5 is a view showing an example of an actual measurement result when the cooling control system of FIG. 4 is used;

DETAILED DESCRIPTION OF PREFERRED EMBODIMENTS

Figure 1:
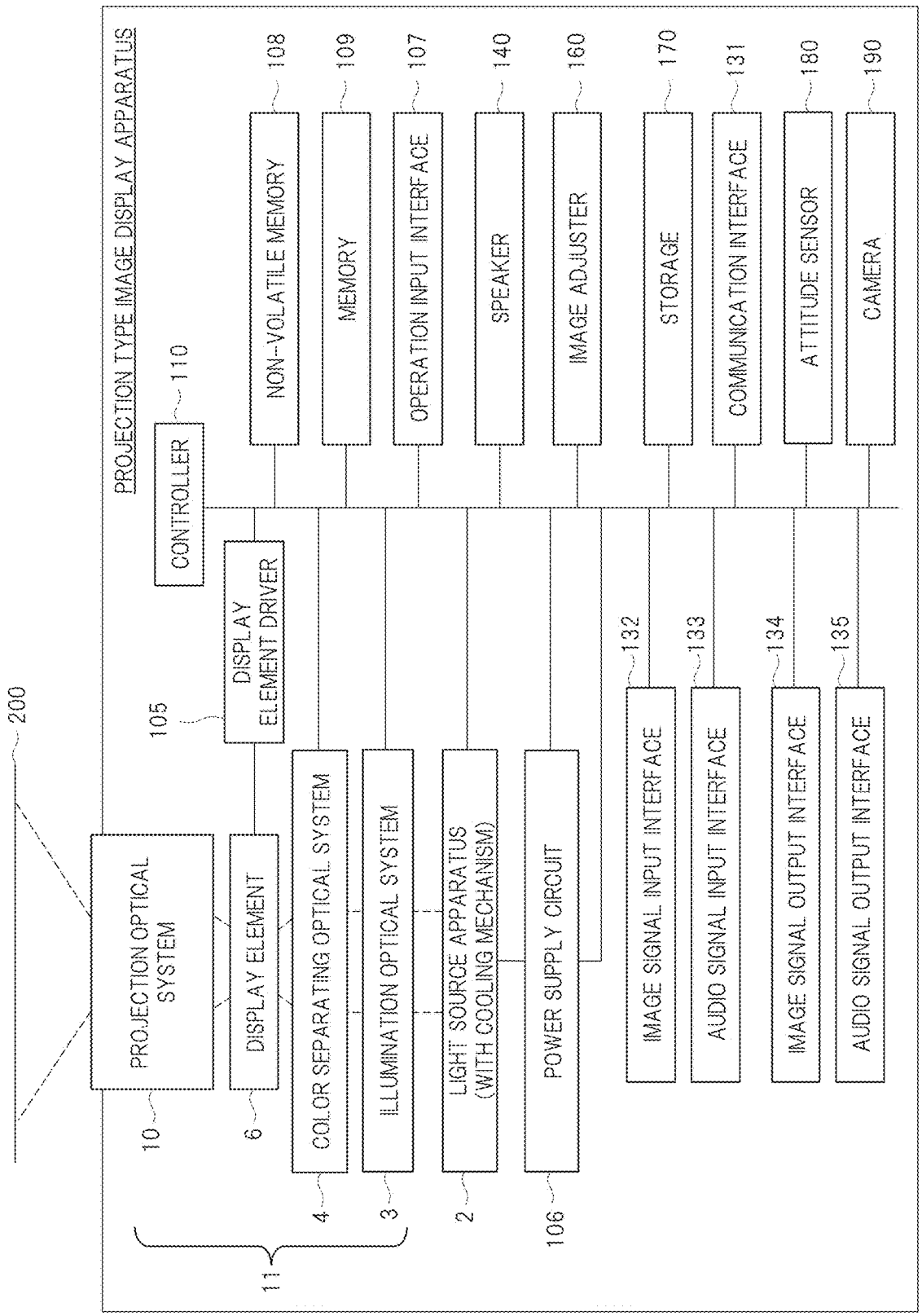
FIG. 1 is a block diagram showing an internal configuration example of a projection type image display apparatus according to a first embodiment of the present invention.

Hereinafter, embodiments of the present invention will be described in detail with reference to the drawings. Incidentally, in all the drawings for explaining the embodiments, in principle, the same members are denoted by the same reference numerals, and a repetitive description thereof will be omitted.

First Embodiment

<<Outline of Projection Type Image Display Apparatus>>

FIG. 1 is a block diagram showing an internal configuration example of a projection type image display apparatus according to a first embodiment of the present invention. A projection type image display apparatus 100 of FIG. 1 is, for example, a projector or the like, and includes a light source apparatus 2, an optical system 11, a display element driver 105, a power supply circuit 106, an operation input interface 107, a non-volatile memory 108, a memory 109, and a controller 110. Further, the projection type image display apparatus 100 may include a communication interface 131, an image signal input interface 132, an audio signal input interface 133, an image signal output interface 134, an audio signal output interface 135, a speaker 140, an image adjuster 160, and a storage 170, an attitude sensor 180, a camera 190, and the like.

The light source apparatus 2 has a light emitting element that emits blue light and a phosphor (yellow phosphor) that receives the blue light and emits predetermined light (yellow light in this example) although described in detail later, and mixes the blue light and the yellow light to generate white light. Further, the light source apparatus 2 includes a cooling mechanism for cooling the light emitting element and the phosphor. The power supply circuit 106 converts AC power, which is inputted from outside, into DC power and supplies power supply (DC power) to the light source apparatus 2. Furthermore, the power supply circuit 106 supplies the necessary power supply (DC power) to each of the other parts.

The optical system 11 includes an illumination optical system 3, a color separating optical system 4, a display element 6, and a projection optical system 10, and, generally speaking, modulates, with the display element 6, light generated based on white light from the light source apparatus 2 to project the modulated light onto an external projection surface 200. The illumination optical system 3 condenses the white light from the light source apparatus 2 and makes it more uniform to irradiate it to the color separating optical system 4. The color separating optical system 4 separates the irradiated white light into red light, green light, and blue light.

The display element 6 transmits or reflects the separated red light, green light, and blue light and, at that time, modulates an intensity of light of each color. The display element driver 105 transmits a drive signal (modulation signal), which corresponds to an image signal, to the display element 6, and the display element 6 modulates the light of each color according to the drive signal. The projection optical system 10 synthesizes the modulated light of each color from the display element 6 as color image light, and magnifies and projects the color image light onto the projection surface 200.

Here, the image signal referred to by the display element driver 105 may be an input image signal inputted from outside via the image signal input interface 132, may be an image signal after the image adjuster 160 performs image adjustment to the input image signal, and may be a signal after an OSD image signal is superimposed on these image signals. At this time, for example, the controller 110 can generate a signal, which superimposes the OSD image signal on the image signal, by using the image stored in the non-volatile memory 108 or the storage 170.

The attitude sensor 180 is composed of a gravity sensor, a gyro sensor, or the like, and detects an installation posture of the projection type image display apparatus 100. For example, the controller 110 may use information on the detected installation posture to rotate a direction of an image to be displayed on the display element 6 and automatically control it as a display direction that has no uncomfortable feeling to an installation state.

The camera 190 is, for example, an infrared camera whose main detection wavelength is infrared rays. In this case, the camera 190 may detect a pointing position on the projection surface 200 indicated by using a pointer apparatus that emits or reflects infrared rays. Further, the camera 190 may detect or the like a person standing in front of the projection surface 200 in order to perform antiglare control or the like such as a reduction in a light output of the projected image. Furthermore, the camera 190 may be a visible light camera. In this case, the camera 190 is used, for example, to record an image around the projection surface 200 or output it outside.

The operation input interface 107 is a light receiver for operation buttons and a remote controller, and inputs an operation signal from the user. The speaker 140 can perform an audio output based on audio data inputted to the audio signal input interface 133. Further, the speaker 140 may output a built-in operation sound or an error warning sound. The communication interface 131 communicates various pieces of data such as control data and contents with an external apparatus, a network, a server, or the like via a wired or wireless interface.

The non-volatile memory 108 stores various pieces of data used in a projector function(s). The memory 109 stores projected image data and control data of the apparatus. The memory 109 or the non-volatile memory 108 may store image data used for generating a GUI (Graphical User Interface) image. The controller 110 controls an operation of each part connected via a bus(es).

The image adjuster 160 performs an image processing on the image data inputted by the image signal input interface 132. For example, included as the image processing are: a scaling processing for enlarging, reducing, and transforming an image; a brightness adjustment processing for changing brightness; a contrast adjustment processing for changing a contrast curve of an image; a gamma adjustment processing for changing a gamma curve(s) indicating gradation characteristics of an image; and a Retinex processing for decomposing an image into light components to change weighting for each component.

The storage 170 records videos, images, audio, various pieces of data, and the like. For example, the videos, images, audio, various pieces of data, and the like may be recorded in advance at a time of product shipment, and various pieces of data such as video data, image data, audio data, and other data acquired from an external apparatus, an external server, and the like via the communication interface 131 may be recorded. Videos, images, various pieces of data, and the like recorded in the storage 170 can be outputted as projected images via the display element 6 and the projection optical system 10. The audio recorded in the storage 170 can be outputted as audio from the speaker 140.

The image signal input interface 132 inputs an image signal from an external apparatus via a wired or wireless interface. The audio signal input interface 133 inputs an audio signal from an external apparatus via a wired or wireless interface. The image signal output interface 134 outputs an image signal to an external apparatus via a wired or wireless interface. Incidentally, the image signal output interface 134 may have a function of outputting an image signal inputted from a first external apparatus, as it is, to a second external apparatus via the image signal input interface 132. Further, the image signal output interface 134 has a function of outputting an image signal, which is based on the image data recorded in the storage 170, to an external apparatus and a function of outputting an image signal, which is based on an image captured by the camera 190, to the external apparatus.

The audio signal output interface 135 outputs an audio signal to an external apparatus via a wired or wireless interface. Incidentally, the audio signal output interface 135 may have a function of outputting an audio signal inputted from a first external apparatus, as it is, to a second external apparatus via the audio signal input interface 133. Further, the audio signal output interface 135 may have a function of outputting an audio signal, which is based on audio data recorded in the storage 170, to an external apparatus.

As described above, the projection type image display apparatus 100 can have various functions.

<<Details of Light Source Apparatus and Optical System>>

Figure 2:
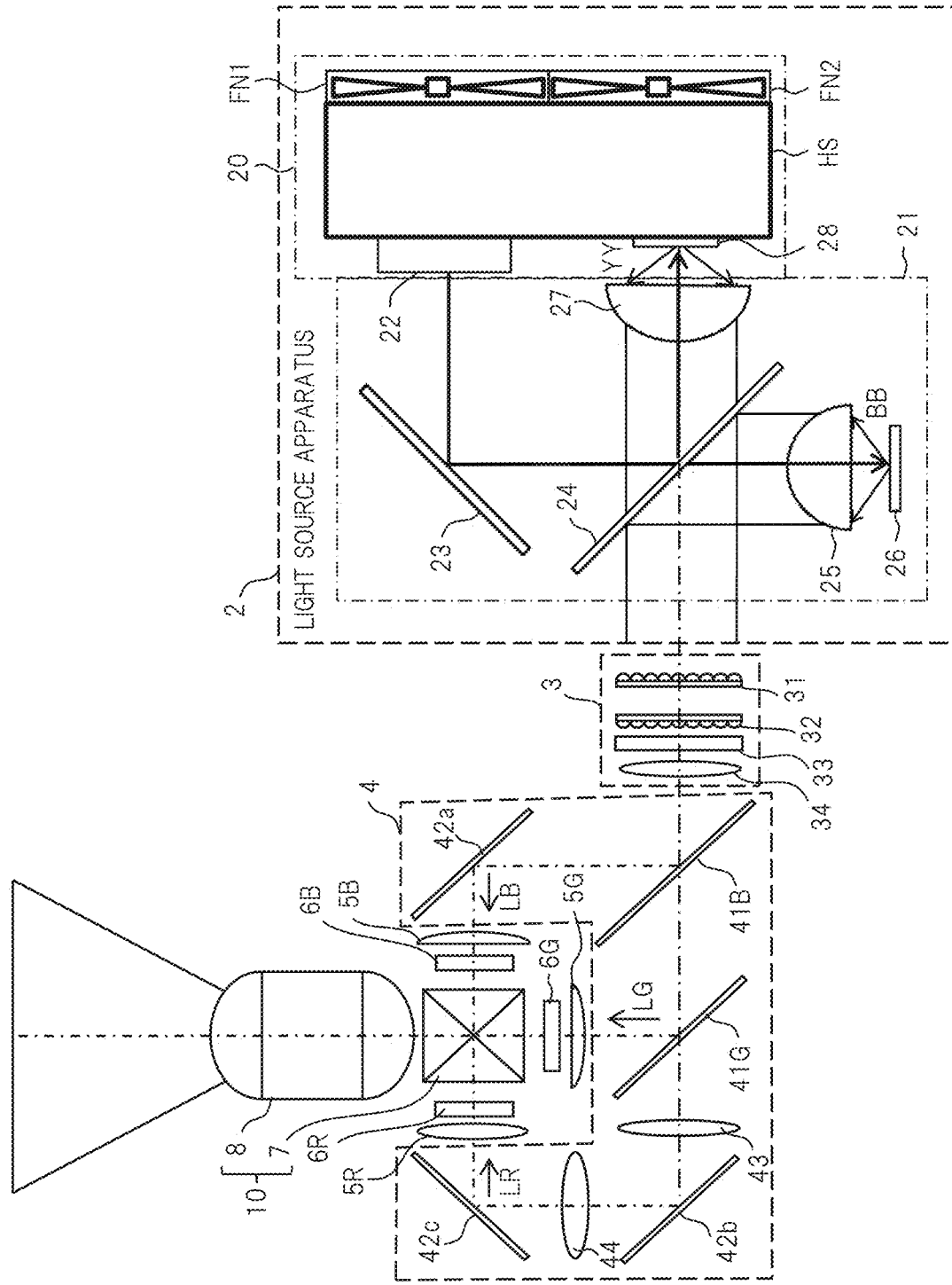
FIG. 2 is a figure showing detailed configuration examples of a light source apparatus and an optical system in FIG. 1.

FIG. 2 is a view showing a detailed configuration example of the light source apparatus and a detailed configuration example of the optical system in FIG. 1. In FIG. 2, the light source apparatus 2 includes a light emitter 20 and a light source optical system 21. The light emitter 20 includes one heat sink HS, a light emitting element (in other words, a light source) 22 and a phosphor 28 that are arranged for the one heat sink HS, and two cooling fans FN1, FN2 for cooling the heat sink HS (specifically, its heat radiation fins). The heat sink HS and the cooling fans FN1, FN2 are cooling mechanisms for the light emitting element 22 and the phosphor 28. Details of the light emitter 20 will be described later. Furthermore, the light source optical system 21 includes a reflection mirror 23, a dichroic mirror 24, condenser lenses 25, 27, and a diffuser plate 26.

The light emitting element 22 is an LD (Laser Diode) element or an LED (Light Emitting Diode) element that emits blue light. The reflection mirror 23 reflects blue light from the light emitting element 22 toward the dichroic mirror 24. The dichroic mirror 24 reflects and transmits the blue light from the light emitting element 22. The blue light transmitted by the dichroic mirror 24 is condensed by the condenser lens 25 and is irradiated to a diffuser plate 26 such as an alumina ceramic plate, for example. In response to this, the diffuser plate 26 diffuses the condensed blue light.

Meanwhile, the blue light reflected by the dichroic mirror 24 is condensed by the condenser lens 27 and is irradiated to the phosphor 28. The phosphor 28 emits yellow light by using the condensed blue light as excitation light. Here, the yellow light is, in detail, yellow fluorescence including light in a green band and light in a red band. Yellow light YY emitted by the phosphor 28 points toward the dichroic mirror 24 via the condenser lens 27. Further, blue light BB diffused by the diffuser plate 26 points toward the dichroic mirror 24 via the condenser lens 25. The dichroic mirror 24 transmits the yellow light YY and reflects the blue light BB. As a result, the light source apparatus 2 irradiates, to the illumination optical system 3, white light that is generated by mixing the blue light BB and the yellow light YY.

The illumination optical system 3 includes multi-lenses 31, 32, a polarization conversion element 33, and a condenser lens 34. The white light from the light source apparatus 2 is divided into a plurality of lights by a plurality of lens cells of the multi-lens 31, and is efficiently guided to the multi-lens 32 and the polarization conversion element 33. Then, the lights are polarized in a predetermined polarization direction(s) by the polarization conversion element 33. The polarized lights are condensed by the condenser lens 34 and are irradiated to the color separating optical system 4.

The color separating optical system 4 includes dichroic mirrors 41B, 41G, reflection mirrors 42*a*, 42*b*, 42*c*, and relay lenses 43, 44. The dichroic mirror 41B reflects blue light (light in the blue band), and transmits green light (light in a green band) and red light (light in the red band) among the white light irradiated from the illumination optical system 3. The reflected blue light is reflected by the reflection mirror 42*a*, and is incident on the display element 6B via the condenser lens 5B.

The dichroic mirror 41G receives the green light and the red light transmitted through the dichroic mirror 41B, reflects the green light, and transmits the red light. The reflected green light is incident on the display element 6G via the condenser lens 5G. Further, the red light transmitted through the dichroic mirror 41G is condensed by the relay lens 43, and is then reflected by the reflection mirror 42b. The reflected red light is condensed again by the relay lens 44, and is reflected by the reflection mirror 42c. The reflected red light is incident on the display element 6R via the condenser lens 5R.

The display elements 6B, 6G, 6R perform light intensity modulation to the incident blue light LB, green light LG, and red light LR for each pixel according to a drive signal (modulation signal) from the display element driver 105 of FIG. 1, respectively, thereby generating outgoing light for obtaining a predetermined image(s). Specifically, used as the display elements 6B, 6G, 6R is a transmissive liquid crystal panel, a reflective liquid crystal panel, a DMD (Digital Micromirror Device: registered trademark) panel or the like. In an example of FIG. 2, the transmissive liquid crystal panel is used.

The blue light, green light, and red light that are outgoing lights from the display elements 6B, 6G, 6R are incident on the projection optical system 10 including a light combining optical prism 7 and a projection lens 8. The light combining optical prism 7 combines (synthesizes) the incident blue light, green light, and red light as color image lights. The projection lens 8 magnifies and projects the color image lights onto the projection surface 200 of FIG. 1.

<<Problem as Premise>>

Similarly to the light emitter 20 of FIG. 2, arranging the light emitting element 22 and the phosphor 28 in close proximity to one heat sink HS makes it possible to downsize the light emitter 20 and thus the light source apparatus 2, for example, in comparison with a case of arranging the light emitting element and phosphor at a distant position from each other and individually providing the cooling mechanisms for them. Further, by using the heat sink HS together with the light emitting element 22 and the phosphor 28, the heat sink HS having a large size can be arranged without waste with respect to the light emitting element 22 which generates a particularly large amount of heat, so that it is expected that cooling efficiency of the light emitting element 22 is increased.

However, in practice, depending on thermal conductivity of the heat sink HS, occur may such a situation that unevenness of heat is caused only to a part of a region close to the light emitting element 22 in the heat sink HS. In this case, the cooling fan FN2 (and a heat radiation fin(s) located in a cooling target region) cannot be effectively utilized, and the heat sink HS (and thus the light emitting element 22) is substantially cooled only by the cooling fan FN1. As a result, the cooling fan FN1 needs to be rotated at a high speed, and the noise of the cooling fan FN1 may increase. Thus, it becomes beneficial to use the light emitter described below.

<<Details of Light Emitter>>

Figure 3A:
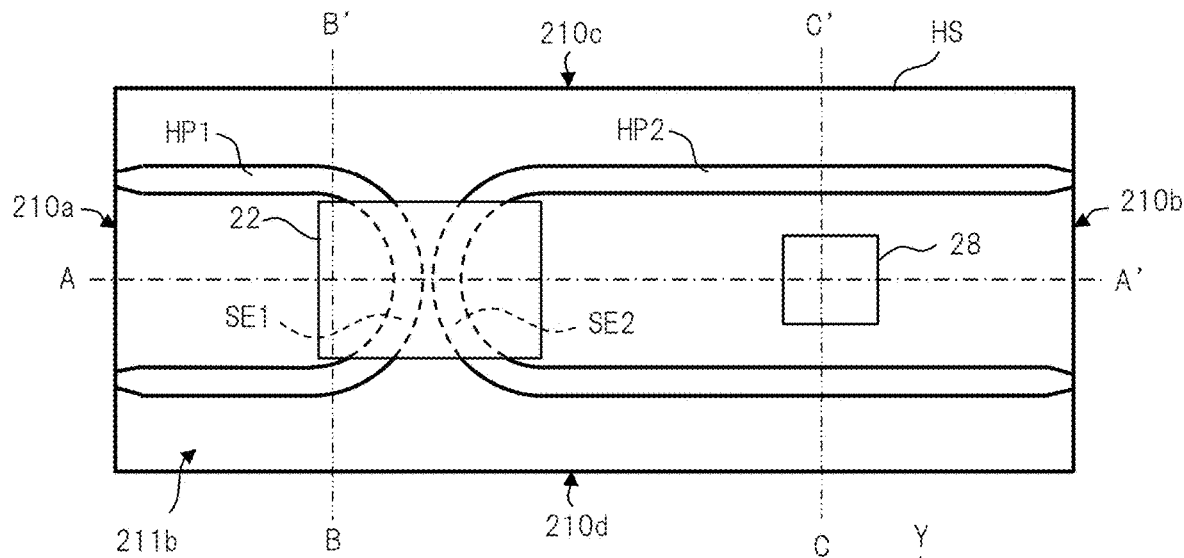
FIG. 3A is a plan view showing a detailed configuration example of a light emitter in FIG. 2.
Figure 3B:
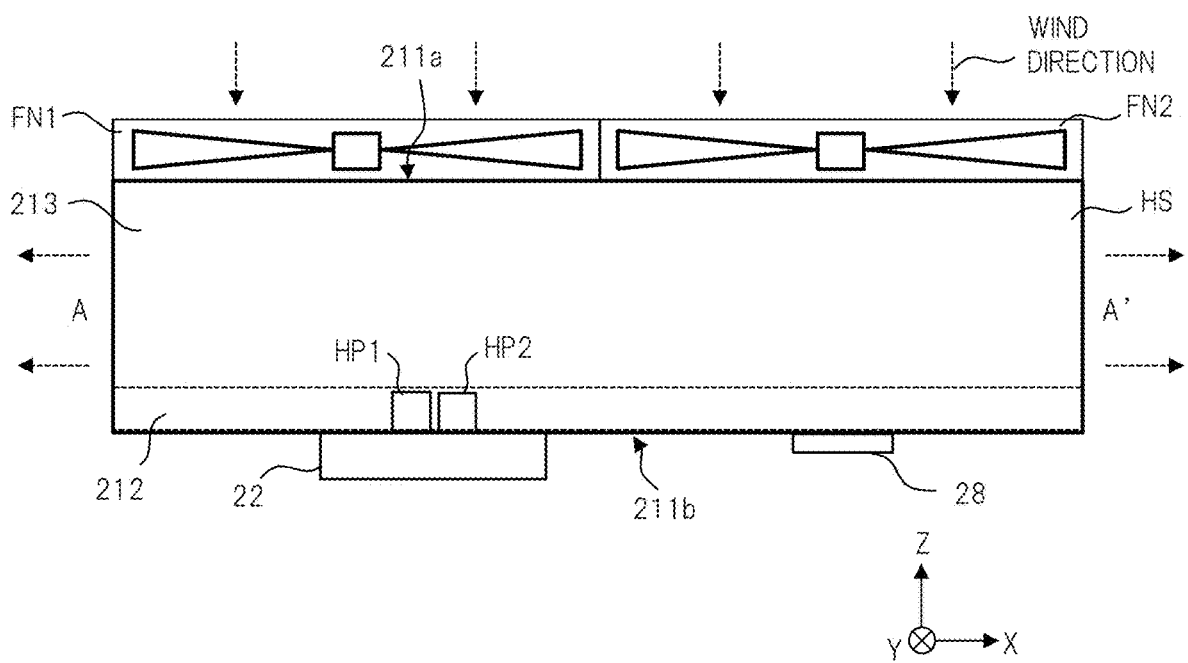
FIG. 3B is a sectional view showing a configuration example between A-A' in FIG. 3A.
Figure 3C:
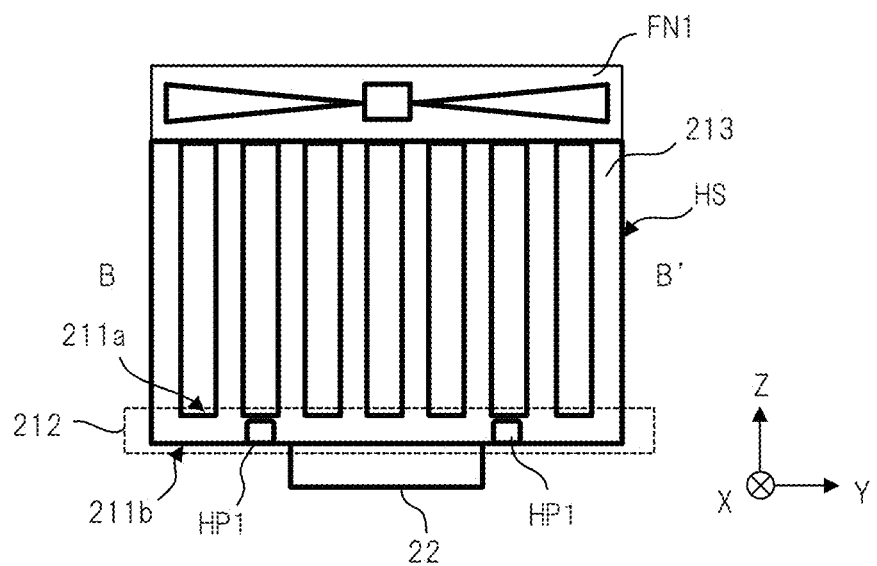
FIG. 3C is a sectional view showing a configuration example between B-B' in FIG. 3A.
Figure 3D:
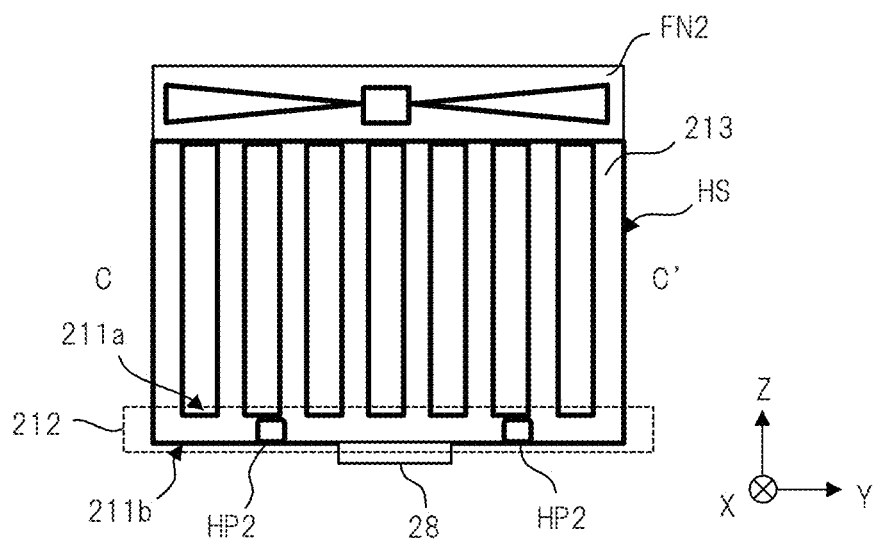
FIG. 3D is a sectional view showing a configuration example between C-C' in FIG. 3A.

FIG. 3A is a plan view showing a detailed configuration example of the light emitter in FIG. 2. FIG. 3B is a sectional view showing a configuration example between A-A' in FIG. 3A. FIG. 3C is a sectional view showing a configuration example between B-B' in FIG. 3A. FIG. 3D is a sectional view showing a configuration example between C-C' in FIG. 3A.

As shown in FIG. 3C (and FIG. 3A), the heat sink HS has: a bottom portion 212 on which a surface 211a and a surface 211b opposing the surface 211a are formed; and a plurality of heat radiation fins 213 extending alongside from the surface 211a. A material of the heat sink HS is typically an aluminum alloy or the like. As shown in FIG. 3A, a shape of the surface 211b is a rectangle (specifically, an oblong shape) configured by: a side 210a extending in a transverse direction; a side 210b opposing the side 210a; a side 210c intersecting with the side 210a and extending in a longitudinal direction; and a side 210d opposing the side 210c. (specifically, an oblong shape).

It is assumed in the specification that a longitudinal direction and a transverse direction of the surface 211b shown in FIG. 3A are an X-axis direction and a Y-axis direction, respectively, and a normal direction of the surface 211b is a Z-axis direction. As shown in FIG. 3A, the light emitting element (in other words, the light source) 22 is arranged (or fixed and adhered) on the surface 211b of the bottom portion 212 via grease or the like. The phosphor 28 is arranged (or fixed and adhered) on the surface 211b of the bottom portion 212 via grease or the like at a predetermined interval from the light emitting element 22. Specifically, the light emitting element 22 is arranged so that a distance to the side 210a is closer than a distance to the side 210b, and the phosphor 28 is arranged so that a distance to the side 210b is closer than a distance to the side 210a.

As shown in FIGS. 3B, 3C and 3D, the cooling fans FN1, FN2 are arranged in the Z-axis direction with respect to the heat sink HS so as to cool the plurality of heat radiation fins 213 of the heat sink HS. As shown in FIG. 3C (and FIG. 3A), the cooling fan FN1 is arranged so as to generate a region opposing the light emitting element 22 in the Z-axis direction. As shown in FIG. 3D (and FIG. 3A), the cooling fan FN2 is arranged so as to generate a region opposing the phosphor 28 in the Z-axis direction.

Here, as shown in FIGS. 3A, 3B, 3C and 3D, one or more (two in this example) heat pipes HP1, HP2 are embedded in the bottom portion 212 of the heat sink HS. Each of the heat pipes HP1, HP2 is typically made of a material such as copper, and conducts heat by repeating vaporization and liquefaction of working liquid (pure water, freon, etc.) sealed therein. Then, the plurality of heat pipes HP1, HP2 are respectively provided with sections SE1, SE2 opposing the light emitting element 22 in the Z-axis direction, but are not provided with sections opposing the phosphor 28 in the Z-axis direction.

Specifically, as shown in FIG. 3A, the heat pipe HP1 is formed so as to return from the side 210a to the side 210a through the section SE1 opposing the light emitting element 22. Meanwhile, the heat pipe HP2 is formed so as to return from the side 210b to the side 210b through the section SE2 opposing the light emitting element 22. Consequently, the working fluid of the heat pipe HP1 vaporizes in the section SE1 in response to the heat generated by the light emitting element 22, and then points toward the side 210a. Similarly, the working fluid of the heat pipe HP2 vaporizes in the section SE2 in response to the heat generated by the light emitting element 22, and then points toward the side 210b. Further, the vaporized working fluid is liquefied at a heat conduction destination, and returns to the directions of the sections SE1, SE2.

This makes it possible to conduct the heat from the light emitting element 22 over a wide range of the heat sink HS. Further, at this time, a certain amount of heat generation (however, heat generation sufficiently smaller than that of the light emitting element 22) due to irradiation of the blue light (for example, laser light) as described in FIG. 2 occurs in the phosphor 28. However, the heat pipe HP2 is not provided with a section opposing the phosphor 28. Therefore, a temperature difference between the section SE2 and the vicinity of the side 210b becomes large, and the heat from the light emitting element 22 can be conducted more efficiently.

Here, as an example, a size of the surface 211b in FIG. 3A in the X-axis direction is about 15 cm, and the size in the Y-axis direction is about 6 cm. Further, a size of the light emitting element 22 in the X-axis direction is about 3.5 cm, and the size in the Y-axis direction is about 3 cm. Each size of the phosphor 28 in the X-axis direction and the Y-axis direction is about 2 cm. Incidentally, strictly speaking, the size of the phosphor 28 itself is, for example, several mm square or the like, and a size of the copper plate or the like on which it is mounted is about 2 cm square. A distance between a center point of the light emitting element 22 and a center point of the phosphor 28 is about 6 cm.

Each outer diameter of the heat pipes HP1, HP2 are about 5 mm. Here, the heat pipes HP1, HP2 may be integrally configured with a heat spreader such as a copper plate. That is, for example, in FIG. 3A, regions of the heat pipes HP1, HP2 exposed on the surface 211b may be heat spreaders attached to the heat pipes HP1, HP2. In this case, the heat pipes HP1, HP2 are provided along the heat spreaders in the Z-axis direction. Further, a line width of the heat spreader may be about 8 mm.

<<Cooling Control System of Light Emitter>>

Figure 4:
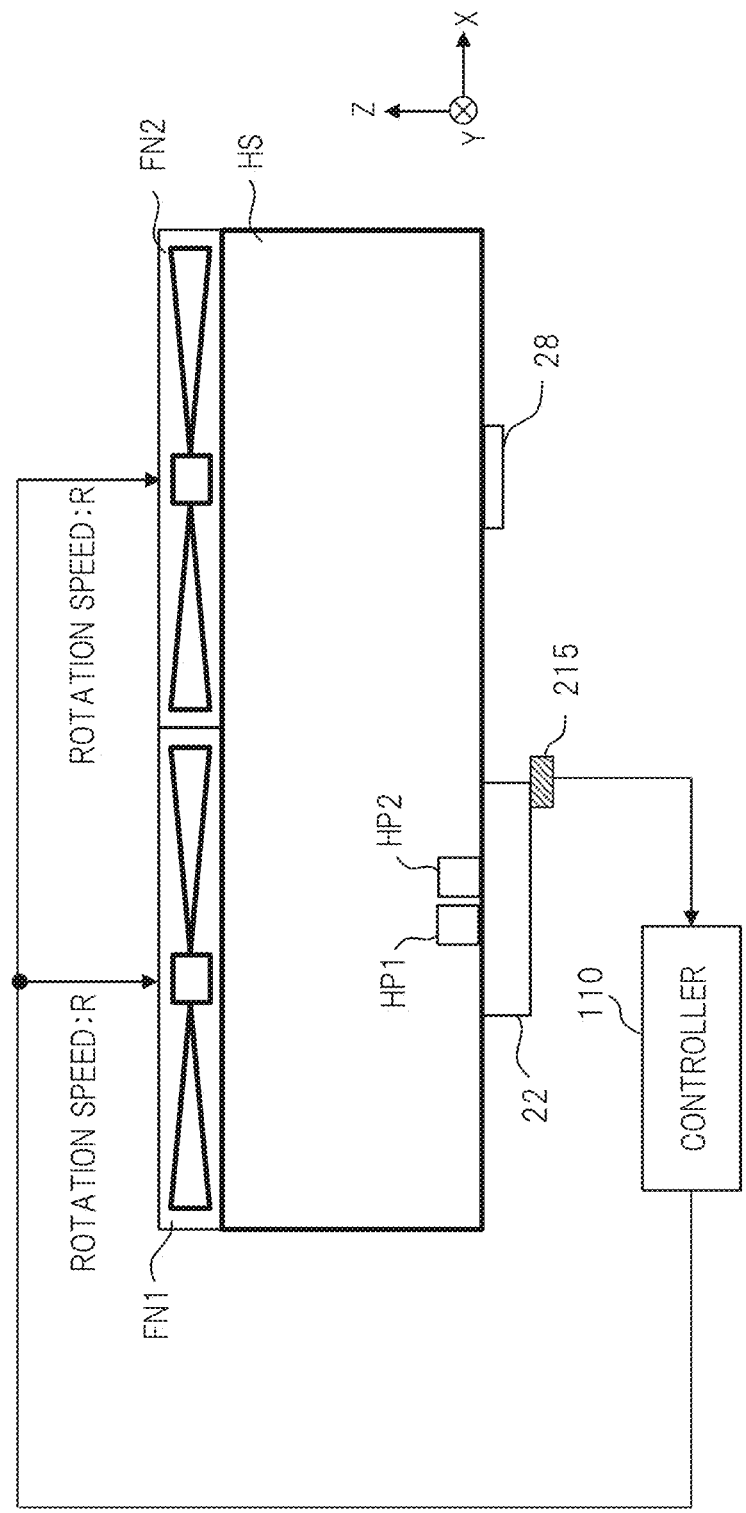
FIG. 4 is a view showing an example of a cooling control system of the light emitter in FIG. 2.

FIG. 4 is a view showing an example of the cooling control system of the light emitter in FIG. 2. Shown in FIG. 4 are the temperature sensor 215 and the controller 110 shown in FIG. 1 in addition to the light emitter having the configuration of FIG. 3B. The temperature sensor 215 is installed on the light emitting element 22, and detects a temperature of the light emitting element 22. The controller 110 is implemented by, for example, a program processing using a CPU (Central Processing Unit) or the like, and instructs the two cooling fans FN1, FN2 to have the same fan rotation speed R based on a detection result(s) of the temperature sensor 215.

It is assumed that a heat sink in which no heat pipe is embedded is used. In this case, since the unevenness of the heat occurs, for example, such a system can be adopted that a temperature sensor is installed on each of the light emitting element 22 and the phosphor 28, the fan rotation speed of the cooling fan FN1 is controlled according to the temperature of the light emitting element 22 and its tolerance, and the fan rotation speed of the cooling fan FN2 is controlled according to the temperature of the phosphor 28 and its tolerance. In this case, a difference (gap) between the fan rotation speeds of the cooling fans FN1, FN2 (specifically, only the cooling fan FN1 has a considerably high rotation speed) is caused, and the noise of the cooling fans FN1, FN2 as a whole may increase.

Meanwhile, as shown in FIG. 4, when the heat sink HS in which the heat pipes HP1, HP2 are embedded is used, the heat can be made uniform in the heat sink HS. In this case, since the two cooling fans FN1, FN2 both cool the heat generation to the same extent, they may be controlled to have the same fan rotation speed R. Controlling the two cooling fans FN1, FN2 to the same fan rotation speed R makes it possible to reduce the noise of the cooling fans FN1, FN2 as a whole. Further, a necessity to provide the temperature sensor on the phosphor 28 does not occur, and the cost and the like can be reduced.

FIG. 5 is a view showing an example of an actual measurement result(s) when the cooling control system of FIG. 4 is used. In FIG. 5, a comparison is made between a case of using a heat sink without a heat pipe and a case of using the heat sink HS with the heat pipes HP1, HP2. Further, in actual measurement, amounts of heat generation of the light emitting element 22 and the phosphor 28 are assumed to be 100 [W] and 25 [W], respectively, and heaters each having the above-mentioned amount of heat generation are used instead of the light emitting element 22 and the phosphor 28.

As shown in FIG. 5, when the fan speeds of the cooling fans FN1, FN2 are both set to 2750 [rpm], the temperature of the light emitting element 22 could be lowered only by 5.4° C. at the heat sink with the heat pipe as compared with the heat sink without the heat pipe. Further, when the fan rotation speeds of the cooling fans FN1, FN2 are both set to 5250 [rpm], the temperature of the light emitting element 22 could be lowered only by 4.9° C. at the heat sink with the heat pipe as compared with the heat sink without the heat pipe.

Further, in any case of the fan rotation speeds of the cooling fans FN1, FN2, a difference (gap) between the temperature of the light emitting element 22 and the temperature of the phosphor 28 becomes smaller at the heat sink with the heat pipe as compared with the heat sink without the heat pipe. From this, it can be seen that the heat is uniformized in the heat sink HS. Incidentally, the thermal resistance [° C./W] in FIG. 5 is a value obtained by dividing a difference ΔT [° C.] between the temperature of the light emitting element 22 (or the phosphor 28) and an outside air temperature by a total amount of heat generation (125 [W]) of the light emitting element 22 and the phosphor 28.

Figure 6A:
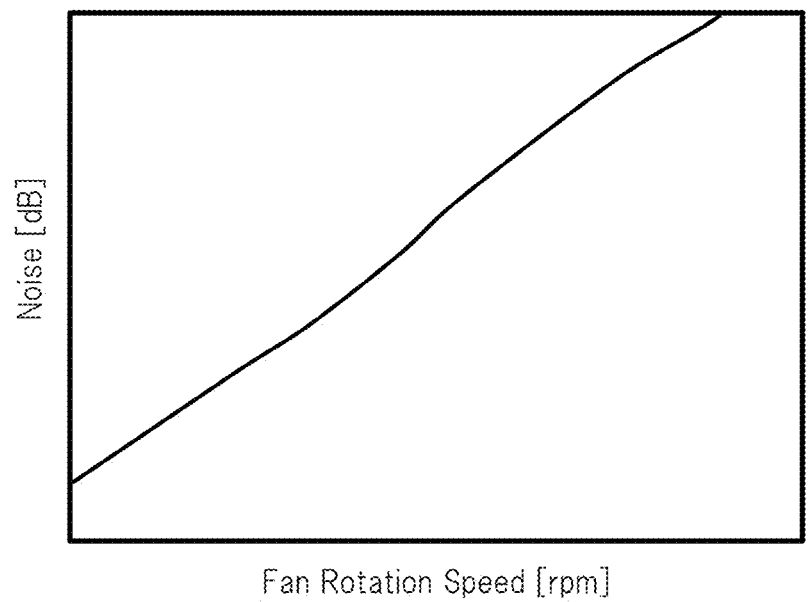
FIG. 6A is a view showing a characteristic example of noise with respect to a rotation speed of a cooling fan.
Figure 6B:
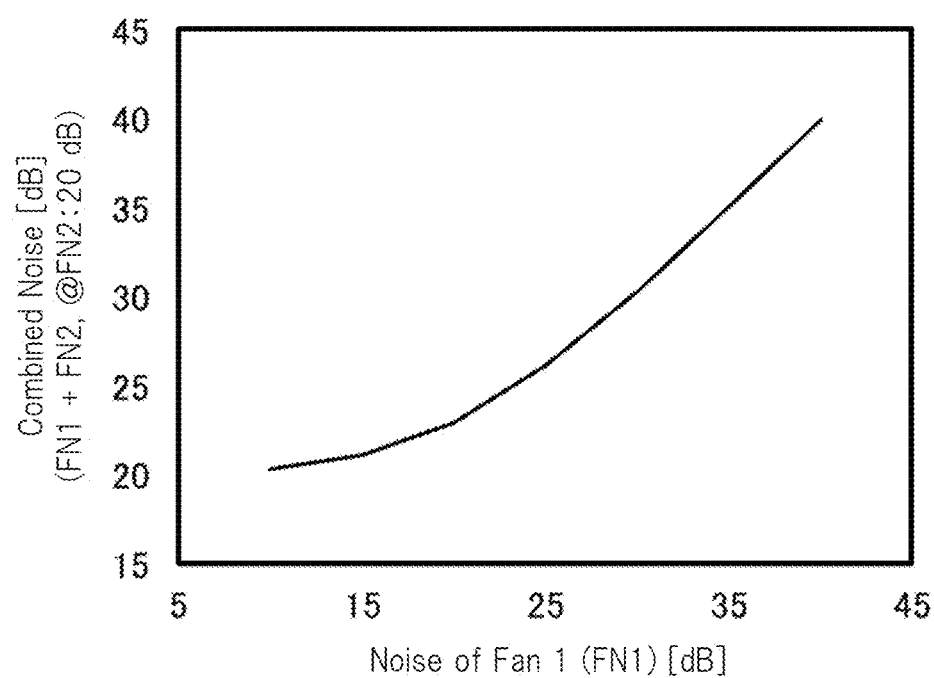
FIG. 6B is a view showing a characteristic example of combined noise by two cooling fans.

FIG. 6A is a view showing a characteristic example of noise with respect to a rotation speed of a cooling fan. FIG. 6B is a view showing a characteristic example of combined noise by two cooling fans. As shown in FIG. 6A, the noise [dB] increases as the rotation speed [rpm] of the cooling fan increases. Shown in FIG. 6B is a characteristic example of combined noise when the noise of one cooling fan FN2 is fixed at 20 [dB] and the noise of the other cooling fan FN1 is increased (that is, when the fan rotation speed is increased). Combined noise L [dB] is calculated by Equation (1), where the noise of the cooling fan FN1 is L1 [dB] and the noise of the cooling fan FN2 is L2 [dB].

$$L = 10 \log_{10}(10^{(L1/10)} + 10^{(L2/10)}) \quad (1)$$

As can be seen from FIG. 6B, the combined noise L [dB] is substantially determined based on the larger noise out of the respective noises of the two cooling fans FN1, FN2. Therefore, in order to minimize the noise, the noises of the two cooling fans FN1, FN2 may be made equal to each other. Thus, using the cooling control system as shown in FIG. 4 makes it possible to efficiently cool the heat sink HS (and thus the light emitting element 22) by the two cooling fans FN1, FN2 and to achieve minimization of the noise.

Main Effects of First Embodiment

As described above, using the light source apparatus and the projection type image display apparatus of the first embodiment makes it possible to typically efficiently cool the light emitting element (light source) 22 included in the light source apparatus 2 and to reduce the noise of the cooling fan constituting the cooling mechanism of the light source apparatus 2. Further, the light source apparatus 2 can also be miniaturized. Incidentally, in this example, a case where a yellow phosphor is used as the phosphor 28 is taken as an example, but the same cooling system can be applied even when a green phosphor is used, for example.

Further, in this example, the light source apparatus 2 is a part of the projection type image display apparatus 100 of FIG. 1, but is not limited to this, and may be a part of various apparatuses using light and may further be not a part of the apparatus but an independent single body such as a lighting apparatus. For example, it can be applied as a light source apparatus for a backlight of a liquid crystal television or the like and as a light source apparatus for a headlamp of a vehicle.

Second Embodiment

<<Details of Light Emitter>>

Figure 7:
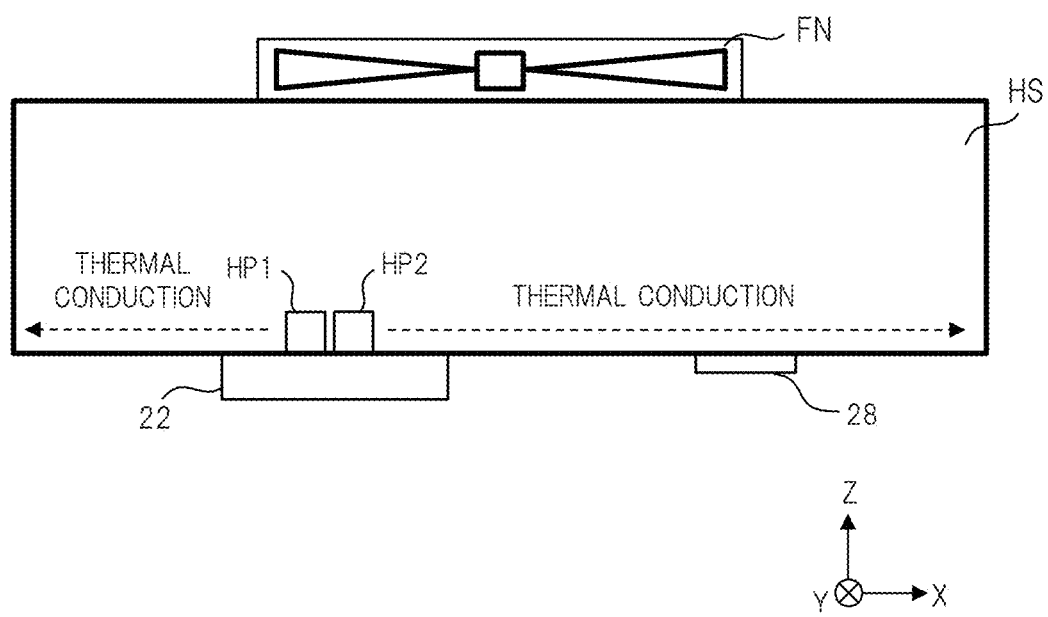
FIG. 7 is a sectional view showing a detailed configuration example of the light emitter in FIG. 2 in a light source apparatus according to a second embodiment of the present invention.

FIG. 7 is a sectional view showing a detailed configuration example of the light emitter in FIG. 2 in a light source apparatus according to a second embodiment of the present invention. A light emitter shown in FIG. 7 has such a configuration that the two cooling fans FN1, FN2 in a configuration example of FIG. 3B are replaced with one cooling fan FN.

As described in the first embodiment, embedding the heat pipes HP1, HP2 in the heat sink HS makes it possible to disperse the heat generated by the light emitting element 22 over the entire heat sink HS. As a result, the entire heat radiation fin 213 provided on the heat sink HS can be effectively utilized as a cooling mechanism, so that the cooling efficiency of the light emitting element 22 can be enhanced as compared with a case where the heat pipe is not embedded. Then, if the heat radiation fins 213 can be effectively used in this way, one cooling fan FN may be sufficient as shown in FIG. 7.

Main Effects of Second Embodiment

As described above, by using the light source apparatus of the second embodiment, the same effects as those of the first embodiment can be obtained. This makes it possible to, for example, lower the rotation speed of the cooling fan FN to such an extent that the entire heat radiation fin 213 can be effectively utilized as compared with a case of arranging one cooling fan on the heat sink HS without the heat pipe and to reduce the noise. Further, as compared with the system of the first embodiment, one cooling fan is sufficient, so that a reduction in cost, a reduction in power consumption, and the like can be achieved. However, when the temperature of the light emitting element 22 is kept at a predetermined value or less, the fan rotation speed can be lowered by using two cooling fans as compared with a case of using one cooling fan, so that the system of the first embodiment becomes useful from the viewpoint of further reducing the noise.

Third Embodiment

<<Details of Light Emitter>>

Figure 8:
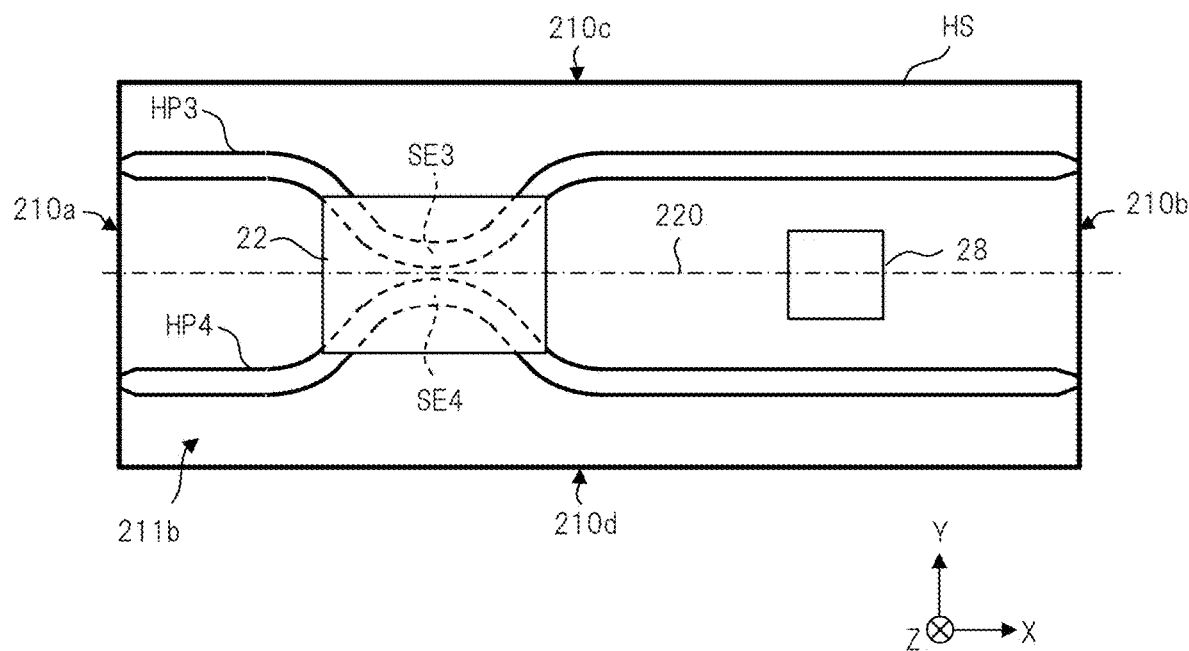
FIG. 8 is a plan view showing a detailed configuration example of the light emitter in FIG. 2 in a light source apparatus according to a third embodiment of the present invention.

FIG. 8 is a plan view showing a detailed configuration example of the light emitter in FIG. 2 in a light source apparatus according to a third embodiment of the present invention. In a light emitter shown in FIG. 8, a plurality of heat pipes HP3, HP4 each having a shape different from the configuration example of FIG. 3A are embedded in the heat sink HS (specifically, the bottom portion 212 (see FIG. 3B)). Similar to the case of FIG. 3A, each of the plurality of heat pipes HP3, HP4 is provided with sections SE3, SE4 opposing the light emitting element 22 in the Z-axis direction, but no section opposing the phosphor 28 in the Z-axis direction is provided.

Specifically, as shown in FIG. 8, the heat pipe HP3 is formed so as to point to the side 210b through the section SE3 opposing the light emitting element 22 from the side 210a. Meanwhile, the heat pipe HP4 is formed at a position between the heat pipe HP3 and the side 210d so as to point to the side 210b through the section SE4 opposing the light emitting element 22 from the side 210a. Further, the heat hype HP3 and the heat hype HP4 are formed so as to be line-symmetric by using, as a reference line 220, an X-axis directional line passing through a center point of the light emitting element 22 and a center point of the phosphor 28. The reference line 220 is parallel to the sides 210c and 210d, and is located between the sides 210c and 210d.

Figure 9:
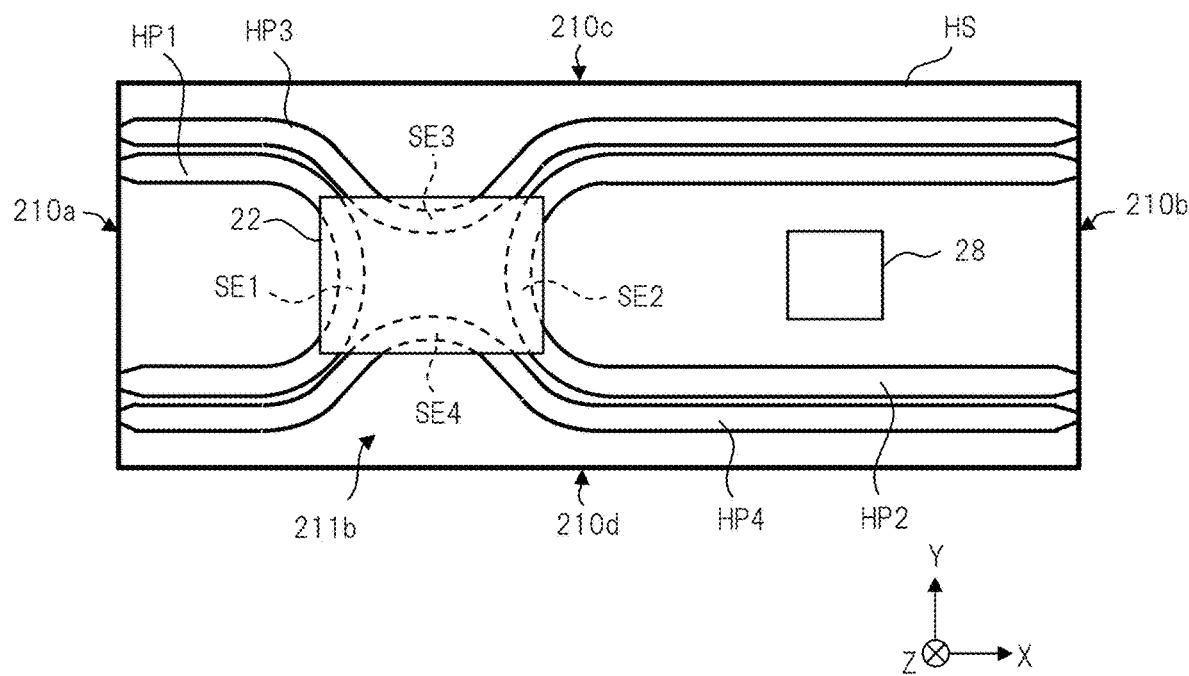
FIG. 9 is a plan view showing another detailed configuration example of the light emitter in FIG. 2 in the light source apparatus according to the third embodiment of the present invention.

FIG. 9 is a plan view showing another detailed configuration example of the light emitter in FIG. 2 in the light source apparatus according to the third embodiment of the present invention. A light emitter shown in FIG. 9 has such a configuration that the heat pipes HP1, HP2 shown in FIG. 3A and the heat pipes HP3, HP4 shown in FIG. 8 are combined. The heat pipe HP3 is formed at a position among the heat pipes HP1, HP2 and the side 210c so as to point to the side 210b through the section SE3 opposing the light emitting element 22 from the side 210a. Meanwhile, the heat pipe HP4 is formed at a position among the heat pipes HP1, HP2 and the side 210d so as to point to the side 210b through the section SE4 opposing the light emitting element 22 from the side 210a.

Main Effects of Third Embodiment

As described above, by using the light source apparatus of the third embodiment, the same effects as those of the first embodiment can be obtained. Further, when the configuration example of FIG. 9 is used, an increase in the cost can be coursed as the number of heat pipes increases in comparison with the configuration example of FIG. 3A or the configuration example of FIG. 8, but the heat of the heat sink HS can further be uniformized. As a result, the cooling efficiency is further enhanced, which makes it possible to further reduce the noise of the cooling fan.

Fourth Embodiment

<<Details of Light Emitter>>

Figure 10A:
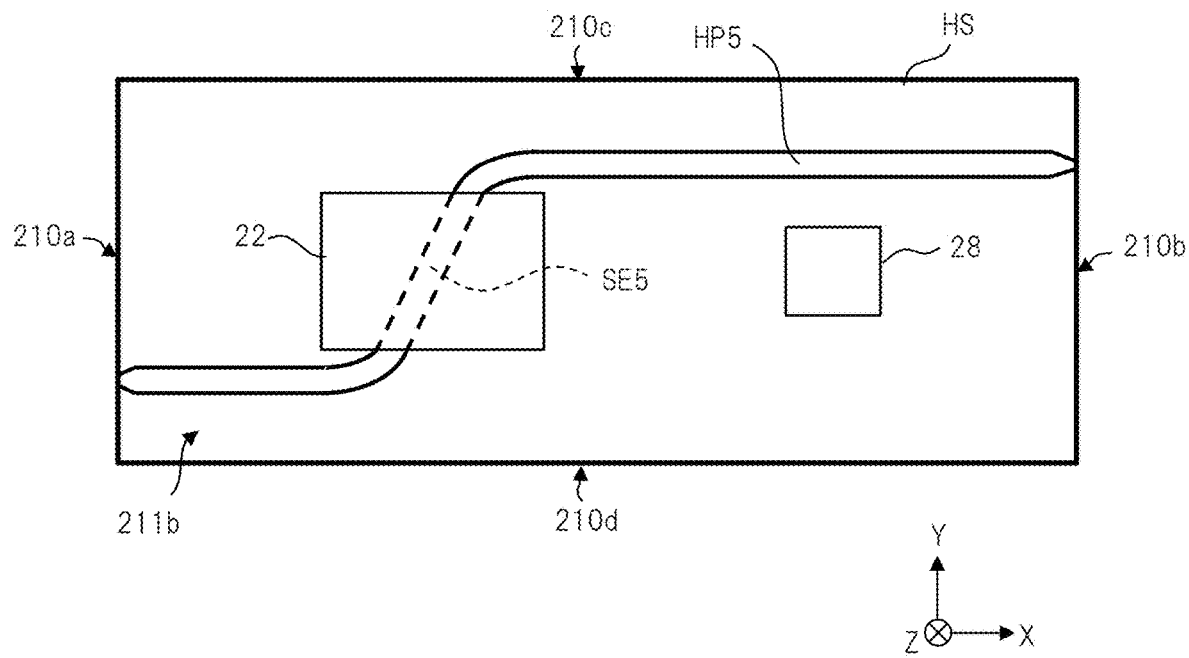
FIG. 10A is a plan view showing a detailed configuration example of the light emitter in FIG. 2 in a light source apparatus according to a fourth embodiment of the present invention.

FIG. 10A is a plan view showing a detailed configuration example of the light emitter in FIG. 2 in a light source apparatus according to a fourth embodiment of the present invention. In a light emitter shown in FIG. 10A, a heat pipe HP5 different from the configuration example of FIG. 3A in number and shape is embedded in the heat sink HS (specifically, the bottom portion 212 (see FIG. 3B)). Similar to the case of FIG. 3A, the heat pipe HP5 is provided with a section SE5 opposing the light emitting element 22 in the Z-axis direction, but is not provided with a section opposing the phosphor 28 in the Z-axis direction. The heat pipe HP5 is formed so as to point toward a portion of the side 210b close to the side 210c through the section SE5 from a portion of the side 210a close to the side 210d.

Figure 10B:
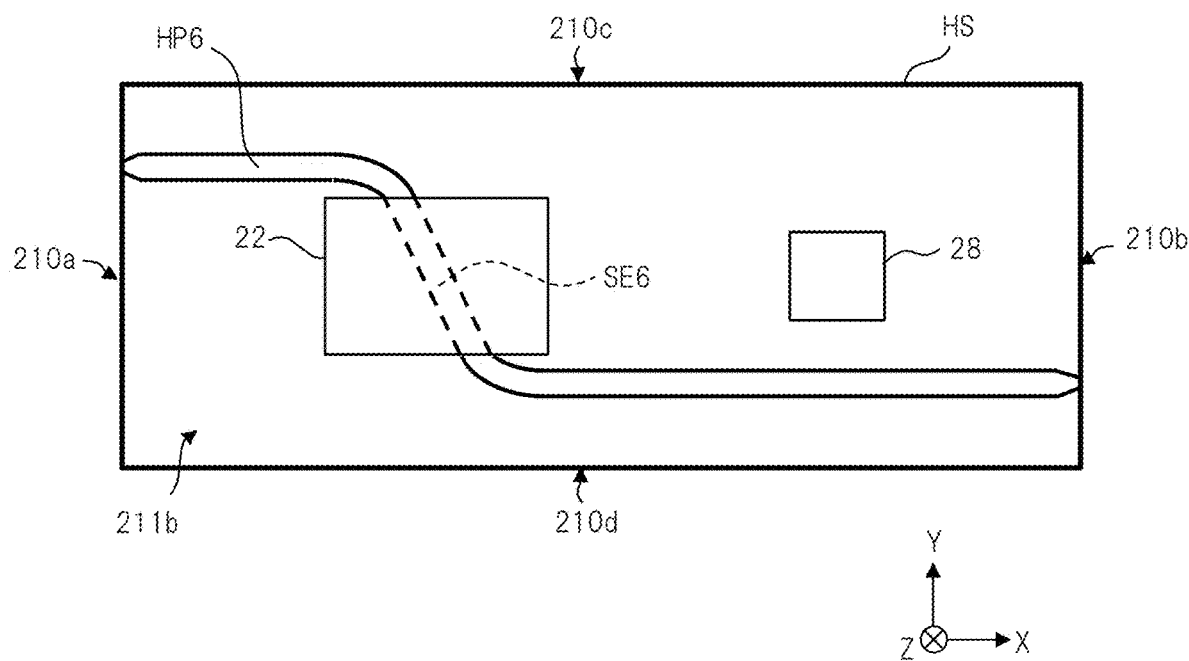
FIG. 10B is a plan view showing a configuration example which has modified FIG. 10A.

FIG. 10B is a plan view showing a configuration example obtained by modifying FIG. 10A. In a light emitter shown in FIG. 10B, a heat pipe HP6 broadly similar to that in a case of FIG. 10A is embedded in the heat sink HS (its bottom portion 212). For example, unlike the case of FIG. 10A, the heat pipe HP6 is formed so as to point to toward a portion of the side 210b close to the side 210d through the section SE6 from a portion of the side 210a close to the side 210c.

Main Effects of Fourth Embodiment

As described above, by using the light source apparatus of the fourth embodiment, the same effects as those of the first embodiment can be obtained. Further, as compared with the case of the first embodiment, uniformity of the heat in the heat sink HS in the Y-axis direction can be lowered, but the cost can be reduced as the number of heat pipes is reduced.

Fifth Embodiment

Details of Light Emitter (Various Modification Examples)

Each of FIG. 11A, FIG. 11B, FIG. 11C, FIG. 11D, FIG. 11E, FIG. 11F, FIG. 11G, FIG. 11H, and FIG. 11I is a sectional view showing a configuration example between A-A' of the light emitter of FIG. 3A in a light source apparatus according to a fifth embodiment, and is a view showing each of various modification examples of FIG. 3B. Light emitters shown in FIGS. 11A to 11I have different shapes in the bottom portion 212 to which the light emitting element 22 and the phosphor 28 are attached in comparison with the configuration example of FIG. 3B.

Specifically, in the configuration example of FIG. 3B, the surface 211b of the bottom portion 212 has a flat shape, and accordingly, a size of the bottom portion 212 in the Z-axis direction, that is, in a thickness direction becomes uniform. Meanwhile, in each configuration example of FIGS. 11A to 11I, when the surface 211b of the bottom portion 212 is divided (separated) into three regions 230a, 230b, 230c, a step(s) is formed in at least one of the regions 230a, 230b, 230c. Along with this, in each configuration example of FIGS. 11A to 11I, the size of the bottom portion 212 in the thickness direction becomes non-uniform.

The region 230a is a region separated (partitioned) by the side 210a and the light emitting element 22 in the X-axis direction. The region 230b is a region separated by the light emitting element 22 and the phosphor 28 in the X-axis direction. The region 230c is a region separated by the phosphor 28 and the side 210b in the X-axis direction. As shown in FIG. 3A, the sides 210a, 210b are sides extending in the Y-axis direction.

The plurality of heat pipes HP1, HP2 are embedded in the bottom portion 212 having such a non-uniform thickness. However, locations where the plurality of heat pipes HP1, HP2 are embedded are the same as those in FIGS. 3A and 3B, etc. That is, each of the plurality of heat pipes HP1, HP2 is embedded in the bottom portion 212 so that a section opposing the light emitting element 22 is provided in the thickness direction of the bottom portion 212. Further, each of the plurality of heat pipes HP1, HP2 is embedded in the bottom portion 212 so that a section opposing the phosphor 28 is not provided in the thickness direction of the bottom portion 212.

Figure 11A:
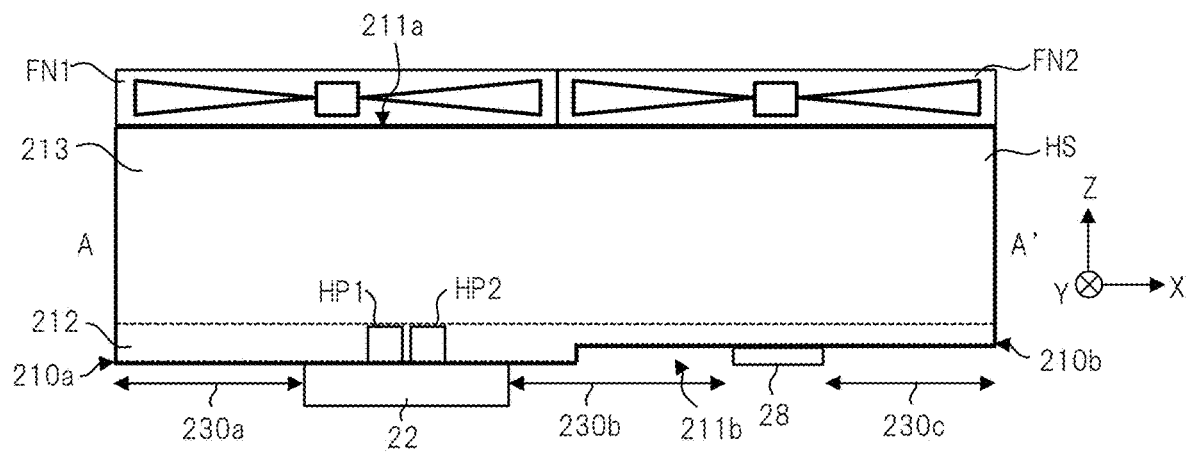
FIG. 11A is a sectional view showing a configuration example between A-A' of the light emitter of FIG. 3A in a light source apparatus according to a fifth embodiment of the present invention.

In the configuration example of FIG. 11A, a step is formed in the region 230b of the bottom portion 212 so that a thickness of an attachment portion of the light emitting element 22 is thicker than a thickness of an attachment portion of the phosphor 28. In the configuration example of FIG. 11B, in addition to the configuration example of FIG. 11A, a step is further formed in the region 230a of the bottom portion 212 so that a thickness of a portion of the side 210a is thicker than the thickness of the attachment portion of the light emitting element 22. In the configuration example of FIG. 11C, contrary to the configuration example of FIG. 11B, a step is formed in the region 230a of the bottom portion 212 so that a thickness of a portion of the side 210a is thinner than the thickness of the attachment portion of the light emitting element 22.

Figure 11B:
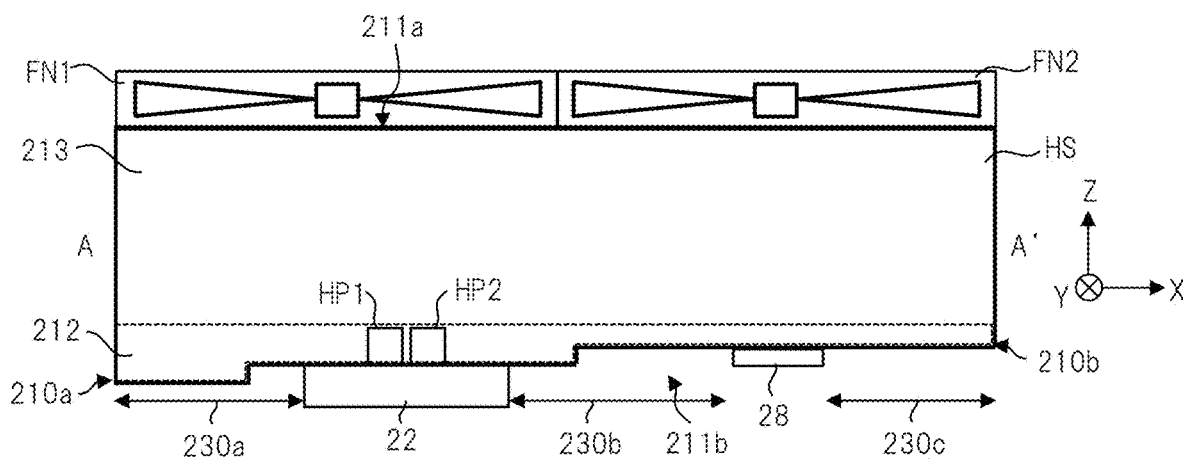
FIG. 11B is sectional view showing a configuration example different from FIG. 11A.
Figure 11C:
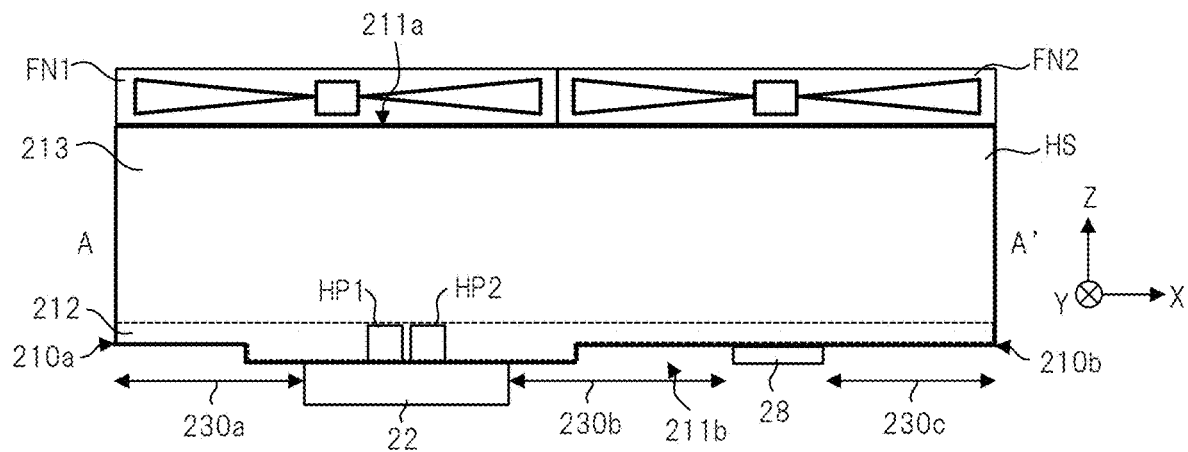
FIG. 11C is a sectional view showing a configuration example further different from FIG. 11A.
Figure 11D:
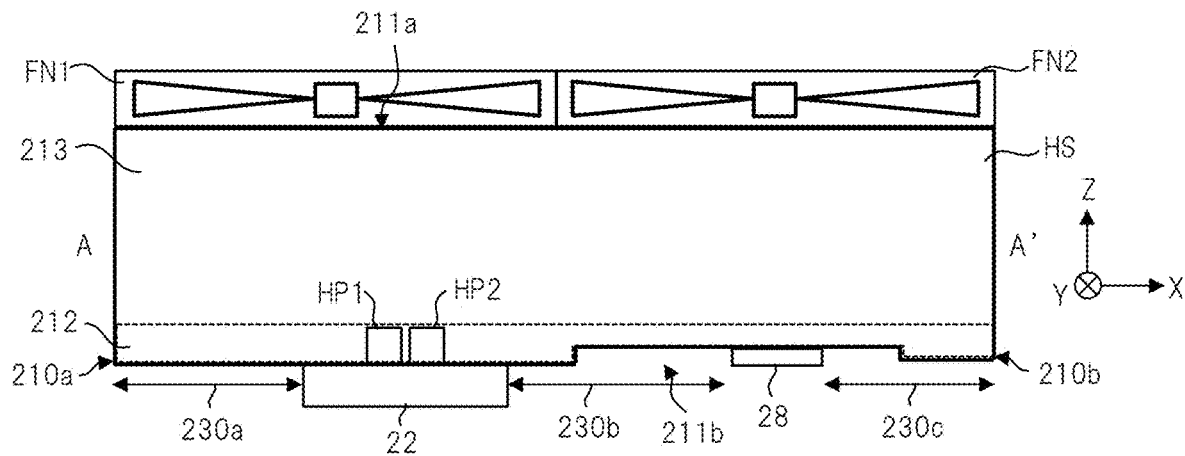
FIG. 11D is a sectional view showing a configuration example further different from FIG. 11A.
Figure 11E:
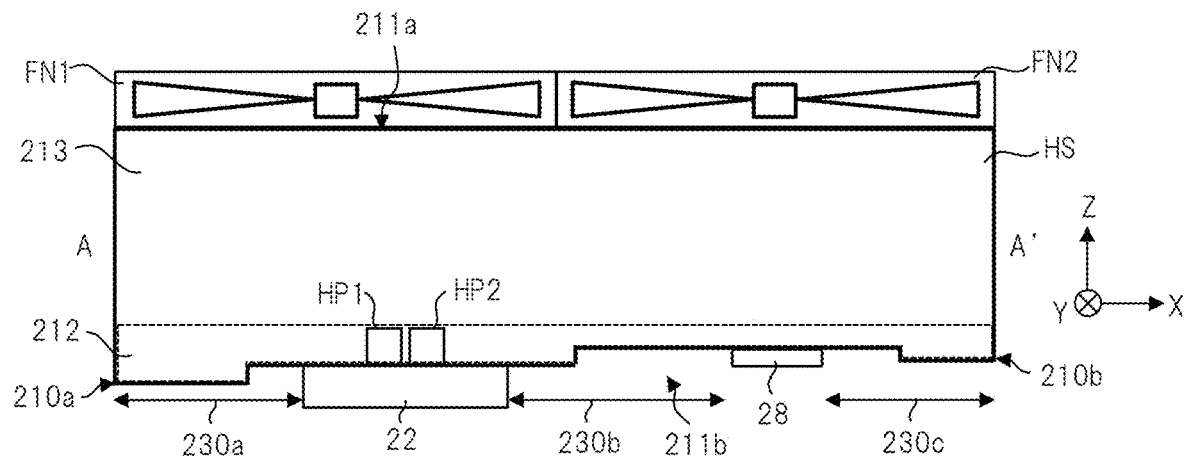
FIG. 11E is a sectional view showing a configuration example further different from FIG. 11A.
Figure 11F:
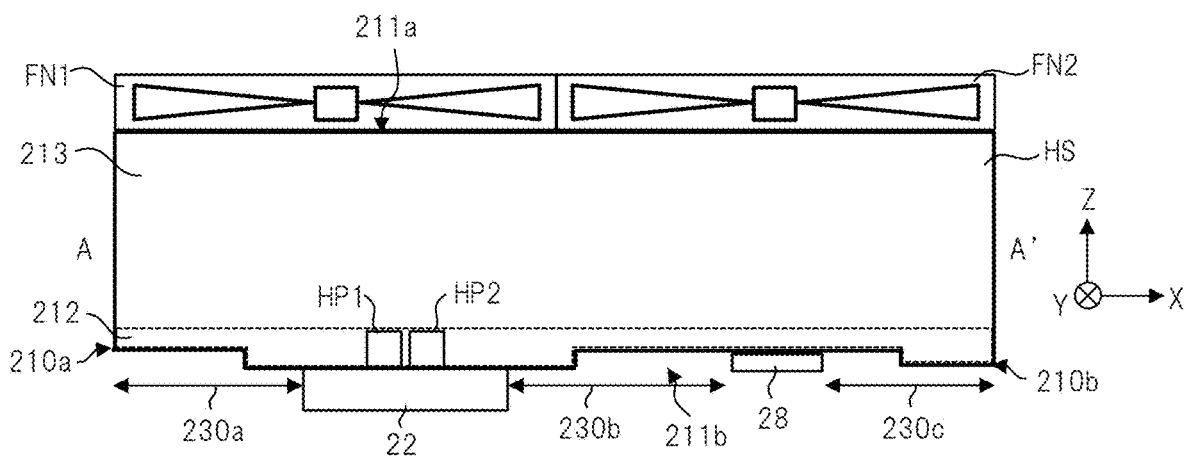
FIG. 11F is a sectional view showing a configuration example further different from FIG. 11A.
Figure 11G:
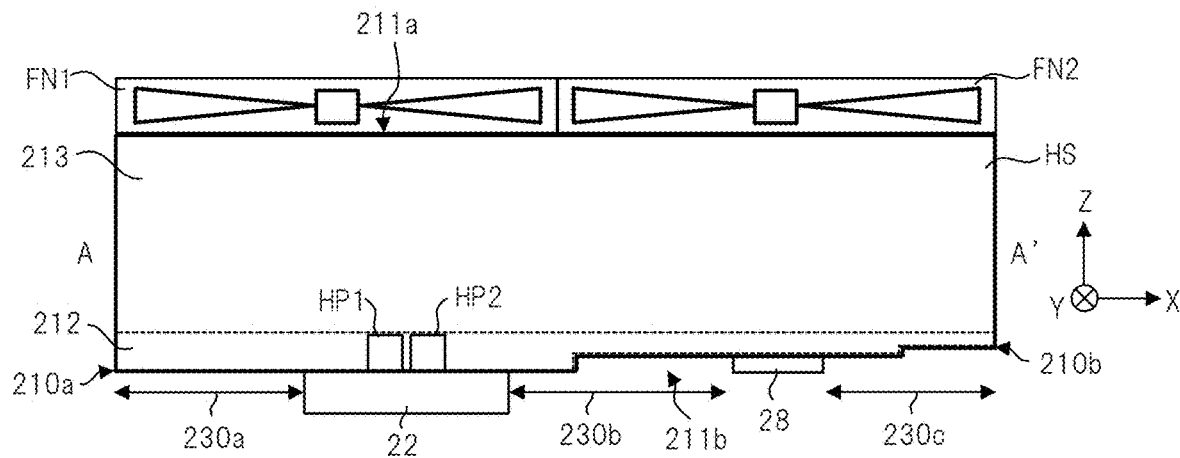
FIG. 11G is a sectional view showing a configuration example further different from FIG. 11A.
Figure 11H:
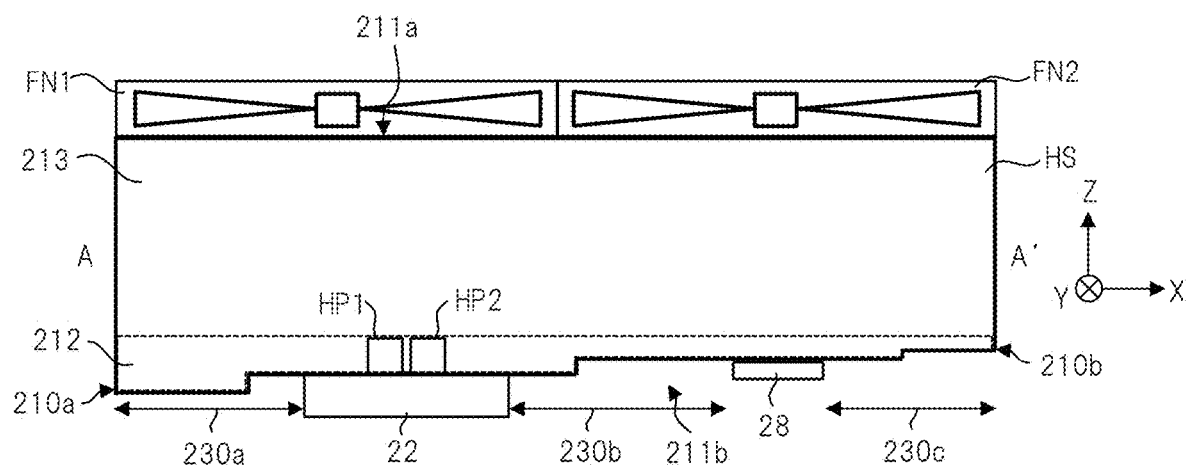
FIG. 11H is a sectional view showing a configuration example further different from FIG. 11A.
Figure 11I:
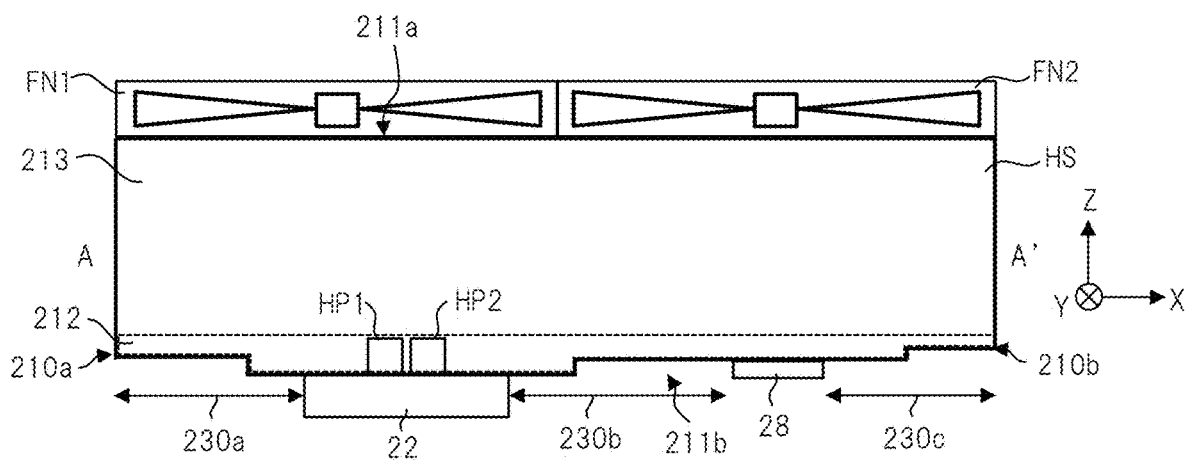
FIG. 11I is a sectional view showing a configuration example further different from FIG. 11A.

In each configuration example of FIGS. 11D, 11E and 11F, in addition to the configuration examples of FIGS. 11A, 11B and 11C, a step is formed in the region 230c of the bottom portion 212 so that a thickness of a portion of the side 210b is thicker than the thickness of the attachment portion of the phosphor 28. In each configuration example of FIGS. 11G, 11H and 11I, contrary to the configuration examples of FIGS. 11D, 11E and 11F, a step is formed in the region 230c of the bottom portion 212 so that a thickness of a portion of the side 210b is thinner than the thickness of the attachment portion of the phosphor 28.

Figure 12:
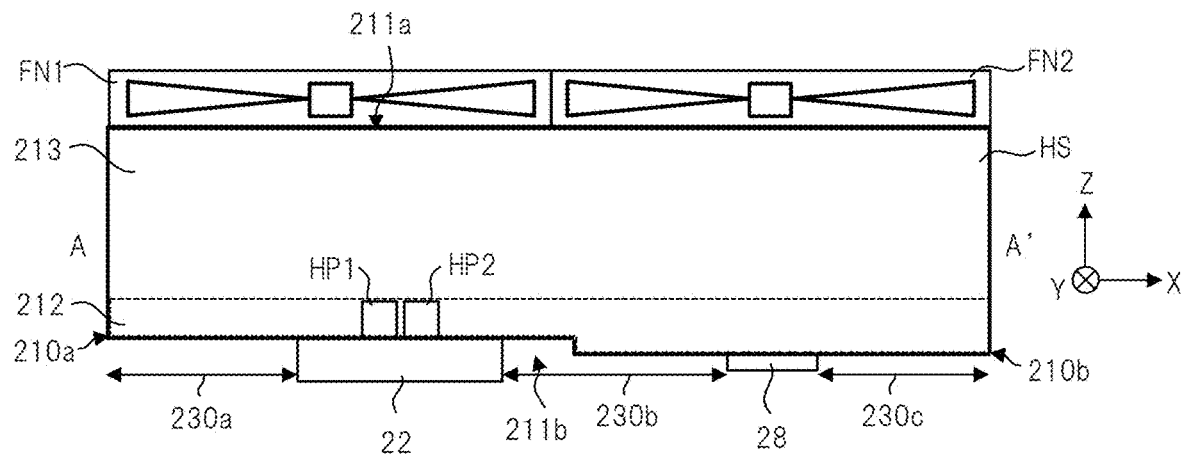
FIG. 12 is a sectional view showing a configuration example which has modified FIGS. 11A to 11I.

FIG. 12 is a sectional view showing a configuration example obtained by modifying FIGS. 11A to 11I. In a configuration example of FIG. 12, contrary to the configuration example of FIG. 11A, a step is formed in the region 230b of the bottom portion 212 so that a thickness of the attachment portion of the light emitting element 22 is thinner than a thickness of the attachment portion of the phosphor 28. In FIG. 12, the step is formed only in the region 230b, but the steps may be formed in the regions 230a, 230c in addition to the region 230b similarly to cases of FIGS. 11B to 11I.

Figure 13:
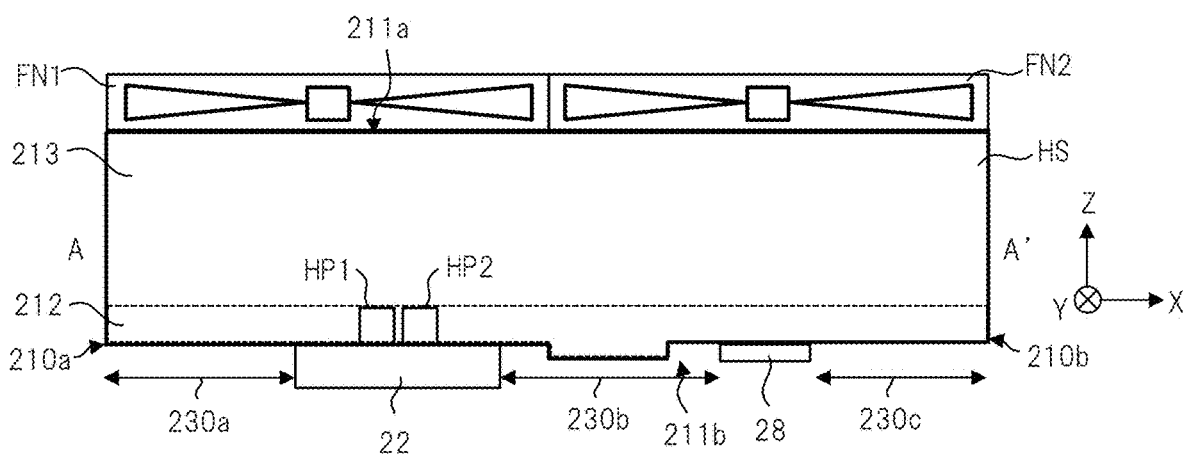
FIG. 13 is a sectional view showing a configuration example which has modified FIGS. 11A to 11I and 12.
Figure 14:
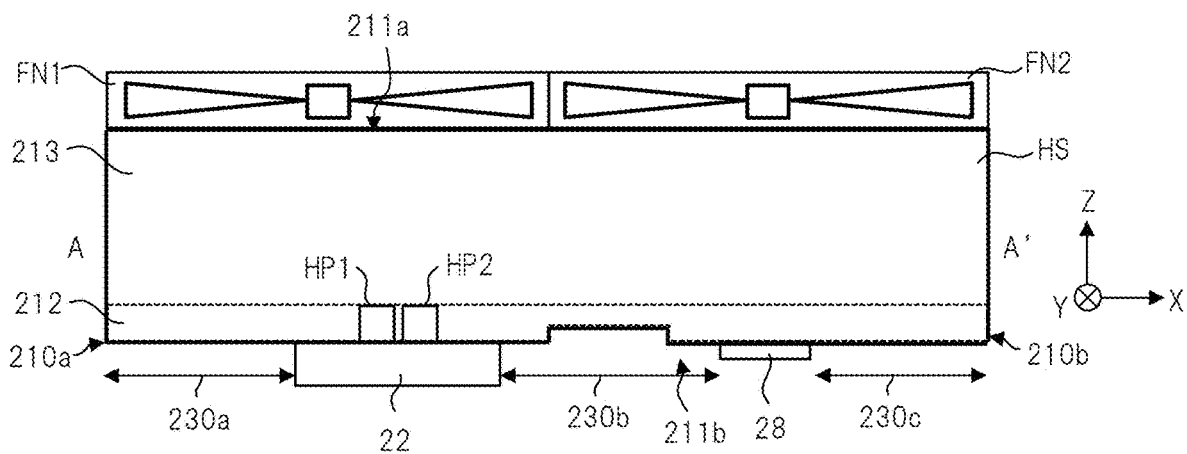
FIG. 14 is a sectional view showing a configuration example which has modified FIGS. 11A to 11I and 12.

Each of FIGS. 13 and 14 is a sectional view showing a configuration example obtained by modifying each of FIGS. 11A to 11I and 12. In a configuration example of FIG. 13, a convex-shaped step is formed in the region 230b. Meanwhile, in a configuration example of FIG. 14, a concave-shaped step is formed in the region 230b. In each case of FIGS. 13 and 14, the thickness of the attachment portion of the light emitting element 22 on the bottom portion 212 becomes equivalent to the thickness of the attachment portion of the phosphor 28. Incidentally, in FIGS. 13 and 14, in addition to the region 230b, the convex, concave, or step-like steps similar to those in FIGS. 11B to 11I may be formed in one or both of the regions 230a, 230c. Further, a step may be formed in one or both of the regions 230a, 230c with respect to the configuration example of FIG. 3B.

As described above, by forming the step(s) on the surface 211b of the bottom portion 212, for example, the following first to third applications may be achieved. As a first application, a layout efficiency of the light source apparatus 2 of FIG. 2 may be enhanced. As an example, in the light source apparatus 2 of FIG. 2, when another cooling mechanism is installed around the light emitter 20 besides the cooling fans FN1, FN2, the another cooling mechanism can be arranged efficiently by utilizing a step for reducing (thinning) the thickness of the bottom portion 212.

Figure 15A:
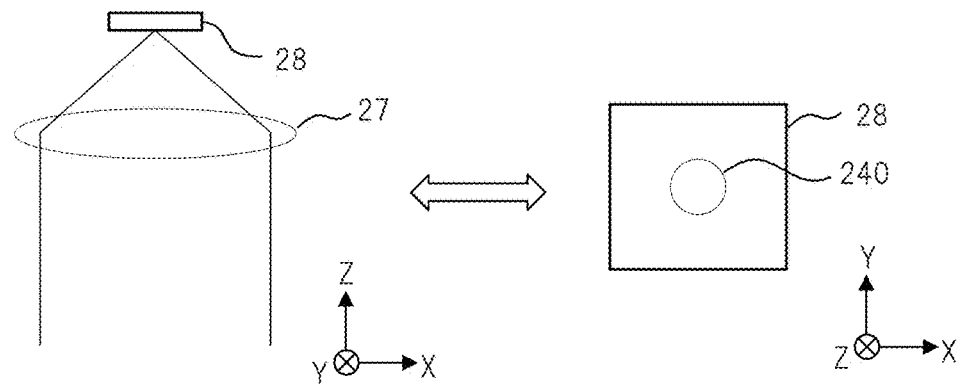
FIG. 15A is a schematic view showing a light irradiation region to a phosphor in using the light emitter of FIG. 3B.
Figure 15B:
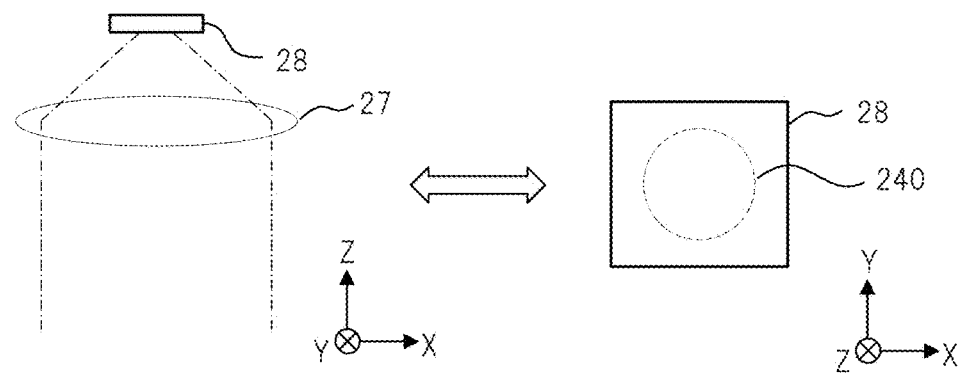
FIG. 15B is a schematic view showing a light irradiation region to a phosphor in using the light emitter of FIG. 12.
Figure 15C:
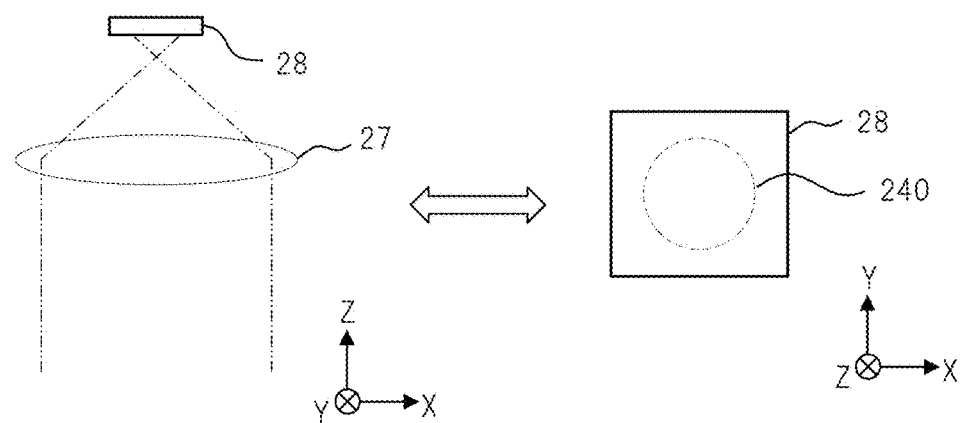
FIG. 15C is a schematic view showing a light irradiation region to a phosphor in using the light emitter of FIG. 11A.

As a second application, for example, by forming a step for increasing (thickening) the thickness of the bottom portion 212, thermal resistance of the bottom portion 212 may be lowered and the cooling efficiency may be enhanced (improved). As a third application, a light irradiation region to the phosphor 28 may be appropriately capable of being adjusted in combination with the condenser lens 27. FIGS. 15A, 15B and 15C are schematic views showing light irradiation regions to the phosphor in using the light emitters of FIGS. 3B, 12 and 11A, respectively. Here, as a premise, as shown in FIG. 15A, it is assumed that a light irradiation region 240 onto the phosphor 28 together with the condenser lens 27 is minimized in using the configuration example of FIG. 3B.

Under a premise like this, when the configuration example of FIG. 12 is used, a distance between the condenser lens 27 and the phosphor 28 in the Z-axis direction is shorter than that in the case of FIG. 3B. As a result, as shown in FIG. 15B, the light irradiation region 240 onto the phosphor 28 is larger than that in a case of FIG. 15A.

Meanwhile, when the configuration example of FIG. 11A is used, a distance between the condenser lens 27 and the phosphor 28 in the Z-axis direction is longer than that in the case of FIG. 3B. As a result, as shown in FIG. 15C, the light irradiation region 240 onto the phosphor 28 is larger than that in the case of FIG. 15A. By adjusting the light irradiation region 240 in this way, for example, durability of the phosphor 28 may be enhanced.

Incidentally, the present invention is not limited to the above-described embodiment, and includes various modification examples. For examples, the embodiments above have been described in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

Further, each of the above configurations, functions, processors, processing means and the like may be realized by hardware by designing or the like a part or all of them with, for example, an integrated circuit. Furthermore, each of the above configurations, functions, and the like may be realized by software by the processor interpreting a program that realizes each function and executing the program. Information such as programs, tables, and files that realize each function can be placed in a memory, a hard disk, a recorder such as an SSD (Solid State Drive), or a recording medium such as an IC card, an SD card, or a DVD.

In addition, the control lines and information lines indicate those that are considered necessary for explanation, and do not necessarily indicate all the control lines and information lines in the product. In practice, it can be considered that almost all components are interconnected.

EXPLANATION OF REFERENCE NUMERALS

2: Light source apparatus; 6: Display element; 11: Optical system; 20: Light emitter; 22: Light emitting element; 28: Phosphor; 100: Projection type image display apparatus; 110: Controller; 210a to 210d: Side; 211a, 211b: Surface; 212: Bottom portion; 213: Heat radiation fin; 215: Temperature sensor; FN, FN1, FN2: Cooling fan; HP1 to HP6: Heat pipe; HS: Heat sink; and SE1 to SE6: Section.

The invention claimed is:

1. A light source apparatus having a light emitting element that emits blue light and a phosphor that receives the blue light to emit predetermined light, the light source apparatus comprising:
    a heat sink including a bottom portion and a plurality of heat radiation fins extending from the bottom portion; and
    one or more cooling fans arranged so as to cool the plurality of heat radiation fins of the heat sink,
    wherein the light emitting element is attached to the bottom portion of the heat sink,
    the phosphor is attached to the bottom portion of the heat sink at a predetermined interval from the light emitting element,
    one or more heat pipes that conducts heat by repeating vaporization and liquefaction of working liquid is embedded in the bottom portion, and
    each of the one or more heat pipes is provided with a section opposing the light emitting element in a thickness direction of the bottom portion,
    wherein a first surface and a second surface opposing the first surface are formed on the bottom portion,
    the plurality of heat radiation fins are extended alongside from the first surface,
    the light emitting element is arranged on the second surface of the bottom portion,
    the phosphor is arranged on the second surface of the bottom portion at a predetermined interval from the light emitting element,
    each of the one or more heat pipes is provided with a section opposing the light emitting element in a normal direction of the second surface,
    wherein each of the one or more heat pipes is not provided with a section opposing the phosphor in the normal direction of the second surface,
    wherein a shape of the second surface is a rectangle configured by a first side and a second side opposing the first side,
    the light emitting element is arranged so as to be closer to a distance to the first side than a distance to the second side,
    the phosphor is arranged so as to be closer to a distance to the second side than a distance to the first side,
    the more heat pipes have:
        a first heat pipe formed so as to return to the first side through a first section opposing the light emitting element from the first side, and
        a second heat pipe formed so as to return to the second side through a second section opposing the light emitting element from the second side, and
    the second heat pipe is not provided with a section opposing the phosphor in the normal direction of the second surface.

2. The light source apparatus according to claim 1, wherein when a side intersecting with the first side in the second surface is set as a third side and a side opposing the third side is set as a fourth side, the more heat pipes further have:
    a third heat pipe formed at a position among the first heat pipe and the second heat pipe and the third side so as to point to the second side through a third section opposing the light emitting element from the first side; and
    a fourth heat pipe formed at a position among the first heat pipe and the second heat pipe and the fourth side so as to point to the second side through a fourth section opposing the light emitting element from the first side, and
    each of the third heat pipe and the fourth heat pipe is not provided with a section opposing the phosphor in the normal direction of the second surface.

3. The light source apparatus according to claim 1, wherein the more cooling fans have:
    a first cooling fan arranged so as to generate a region opposing the light emitting element in the normal direction of the second surface; and
    a second cooling fan arranged so as to generate a region opposing the phosphor in the normal direction of the second surface.

4. The light source apparatus according to claim 3, further comprising:
    a temperature sensor that detects a temperature of the light emitting element; and a controller instructing the same fan rotation speed to the first cooling fan and the second cooling fan based on a detection result of the temperature sensor.

5. The light source apparatus according to claim 1, wherein the phosphor receives the blue light to emit yellow light, and
the light source apparatus produces white light by mixing the blue light and the yellow light.

6. The light source apparatus according to claim 1, wherein a thickness of an attachment portion of the light emitting element and a thickness of an attachment portion of the phosphor are different from each other at the bottom portion.

7. A projection type image display apparatus having a light source apparatus generating white light by mixing blue light and yellow light, and an optical system modulating, by a display element, light generated based on the white light from the light source apparatus to project the modulated light onto an external projection surface, the projection type image display apparatus comprising:
a heat sink having a bottom portion and a plurality of heat radiation fins extending from the bottom portion,
one or more cooling fans arranged so as to cool the plurality of heat radiation fins of the heat sink,
a light emitting element attached to the bottom portion of the heat sink and emitting blue light; and
a phosphor attached to the bottom portion of the heat sink at a predetermined interval from the light emitting element and receiving the blue light to emit the yellow light,
wherein one or more heat pipes conducting heat by repeating vaporization and liquefaction of working fluid is embedded in the bottom portion,
each of the one or more heat pipes is provided with a section opposing the light emitting element in a thickness direction of the bottom portion,
wherein a first surface and a second surface opposing the first surface are formed on the bottom portion,
the plurality of heat radiation fins extend alongside from the first surface,
the light emitting element is arranged on the second surface of the bottom portion,
the phosphor is arranged on the second surface of the bottom portion at a predetermined interval from the light emitting element,
each of the one or more heat pipes is provided with a section opposing the light emitting element in a normal direction of the second surface,
wherein each of the one or more of heat pipes is not provided with a section opposing the phosphor in the normal direction of the second surface,
wherein a shape of the second surface is a rectangle configured by a first side and a second side opposing the first side,
the light emitting element is arranged so as to be closer to a distance to the first side than a distance to the second side,
the phosphor is arranged so as to be closer to a distance to the second side than a distance to the first side,
the plurality of heat pipes have:
a first heat pipe formed so as to return to the first side through a first section opposing the light emitting element from the first side; and
a second heat pipe formed so as to return to the second side through a second section opposing the light emitting element from the second side, and
the second heat pipe is not provided with a section opposing the phosphor in the normal direction of the second surface.

8. The projection type image display apparatus according to claim 7,
wherein when a side intersecting with the first side in the second surface is set as a third side and a side opposing the third side is set as a fourth side, the more heat pipes further have:
a third heat pipe formed at a position among the first heat pipe and the second heat pipe and the third side so as to point to the second side through a third section opposing the light emitting element from the first side; and
a fourth heat pipe formed at a position among the first heat pipe and the second heat pipe and the fourth side so as to point to the second side through a fourth section opposing the light emitting element from the first side, and
the third heat pipe and the fourth heat pipe are not provided with sections opposing the phosphor in the normal direction of the second surface.

9. The projection type image display apparatus according to claim 7,
wherein the plurality of cooling fans have:
a first cooling fan arranged so as to generate a region opposing the light emitting element in the normal direction of the second surface; and
a second cooling fan arranged so as to generate a region opposing the phosphor in the normal direction of the second surface.

10. The projection type image display apparatus according to claim 9, further comprising:
a temperature sensor that detects a temperature of the light emitting element; and
a controller instructing the same fan rotation speed to the first cooling fan and the second cooling fan based on a detection result of the temperature sensor.

11. The projection type image display apparatus according to claim 7,
wherein a thickness of an attachment portion of the light emitting element and a thickness of an attachment portion of the phosphor are different from each other at the bottom portion.

12. A light source apparatus having a light emitting element that emits blue light and a phosphor that receives the blue light to emit predetermined light, the light source apparatus comprising:
a heat sink including a bottom portion and a plurality of heat radiation fins extending from the bottom portion; and
one or more cooling fans arranged so as to cool the plurality of heat radiation fins of the heat sink,
wherein the light emitting element is attached to the bottom portion of the heat sink,
the phosphor is attached to the bottom portion of the heat sink at a predetermined interval from the light emitting element,
one or more heat pipes that conducts heat by repeating vaporization and liquefaction of working liquid is embedded in the bottom portion, and
each of the one or more heat pipes is provided with a section opposing the light emitting element in a thickness direction of the bottom portion,
wherein a first surface and a second surface opposing the first surface are formed on the bottom portion, the plurality of heat radiation fins are extended alongside from the first surface, the light emitting element is arranged on the second surface of the bottom portion, the phosphor is arranged on the second surface of the bottom portion at a predetermined interval from the light emitting element, each of the one or more heat pipes is provided with a section opposing the light emitting element in a normal direction of the second surface, wherein each of the one or more heat pipes is not provided with a section opposing the phosphor in the normal direction of the second surface, wherein a shape of the second surface is a rectangle configured by a first side, a second side opposing the first side, a third side intersecting with the first side, and a fourth side opposing the third side, the light emitting element is arranged so as to closer to a distance to the first side than a distance to the second side, the phosphor is arranged so as to closer to a distance to the second side than a distance to the first side, the more heat pipes have:
  a third heat pipe formed so as to point to the second side through a third section opposing the light emitting element from the first side; and
  a fourth heat pipe formed at a position between the third heat pipe and the fourth side so as to point to the second side through a fourth section opposing the light emitting element from the first side, and each of the third heat pipe and the fourth heat pipe is not provided with a section opposing the phosphor in the normal direction of the second surface.

13. A projection type image display apparatus having a light source apparatus generating white light by mixing blue light and yellow light, and an optical system modulating, by a display element, light generated based on the white light from the light source apparatus to project the modulated light onto an external projection surface, the projection type image display apparatus comprising:

a heat sink having a bottom portion and a plurality of heat radiation fins extending from the bottom portion,
  one or more cooling fans arranged so as to cool the plurality of heat radiation fins of the heat sink,
  a light emitting element attached to the bottom portion of the heat sink and emitting blue light; and
  a phosphor attached to the bottom portion of the heat sink at a predetermined interval from the light emitting element and receiving the blue light to emit the yellow light, wherein one or more heat pipes conducting heat by repeating vaporization and liquefaction of working fluid is embedded in the bottom portion, each of the one or more heat pipes is provided with a section opposing the light emitting element in a thickness direction of the bottom portion, wherein a first surface and a second surface opposing the first surface are formed on the bottom portion, the plurality of heat radiation fins extend alongside from the first surface, the light emitting element is arranged on the second surface of the bottom portion, the phosphor is arranged on the second surface of the bottom portion at a predetermined interval from the light emitting element, each of the one or more heat pipes is provided with a section opposing the light emitting element in a normal direction of the second surface, wherein each of the one or more of heat pipes is not provided with a section opposing the phosphor in the normal direction of the second surface, wherein a shape of the second surface is rectangle configured by a first side, a second side opposing the first side, a third side intersecting with the first side, and a fourth side opposing the third side, the light emitting element is arranged so as to be closer to a distance to the first side than a distance to the second side, the phosphor is arranged so as to be closer to a distance to the second side than a distance to the first side, the more heat pipes have:
  a third heat pipe formed so as to point to the second side through a third section opposing the light emitting element from the first side; and
  a fourth heat pipe formed at a position between the third heat pipe and the fourth side so as to point to the second side through a fourth section opposing the light emitting element from the first side, and the third heat pipe and the fourth heat pipe are not provided with sections opposing the phosphor in the normal direction of the second surface.

\* \* \* \* \*